(12) United States Patent  
Hisamitsu et al.

(10) Patent No.: US 7,517,566 B2
(45) Date of Patent: Apr. 14, 2009

(54) LIQUID CRYSTAL COMPOSITION CONTAINING AT LEAST TWO KINDS OF GELLING AGENTS AND LIQUID CRYSTAL DISPLAY DEVICE USING THE SAME

(75) Inventors: Akihito Hisamitsu, Osaka (JP); Nobuyuki Kobayashi, Kobe (JP); Tomoo Izumi, Toyonaka (JP)

(73) Assignee: Konica Minolta Holdings, Inc., Tokyo (JP)

( * ) Notice: Subject to any disclaimer, the term of this patent is extended or adjusted under 35 U.S.C. 154(b) by 147 days.

(21) Appl. No.: 11/444,903

(22) Filed: Jun. 1, 2006

(65) Prior Publication Data

US 2006/0275557 A1    Dec. 7, 2006

(30) Foreign Application Priority Data

Jun. 6, 2005  (JP)  ............................. 2005-165263
Apr. 18, 2006  (JP)  ............................. 2006-114154

(51) Int. Cl.
*G03C 19/00*  (2006.01)
*G03C 19/52*  (2006.01)

(52) U.S. Cl. ........................... 428/1.1; 428/1.3; 430/20; 252/299.01; 252/299.5; 252/299.7; 349/179

(58) Field of Classification Search ................. 428/1.1, 428/1.3; 430/20; 252/299.01, 299.5, 299.7; 349/179

See application file for complete search history.

(56) References Cited

U.S. PATENT DOCUMENTS

| 6,074,710 | A | 6/2000 | Kato et al. | |
| 6,618,103 | B2 * | 9/2003 | Hisamitsu et al. | 349/78 |
| 2006/0013790 | A1 * | 1/2006 | Shimizu | 424/70.12 |

FOREIGN PATENT DOCUMENTS

| JP | 11-052341 | 2/1999 |
| JP | 2004-226552 | 8/2004 |
| JP | 2005-091738 | 4/2005 |

OTHER PUBLICATIONS

Ma, R.-Q., & Yang, D.-K. (1997). 9.2/Ma: 9.2: Polymer-Stabilized Bistable Black-White Cholesteric Reflective Display. SID 97 Digest, pp. 101-104.

* cited by examiner

*Primary Examiner*—Geraldina Visconti
(74) *Attorney, Agent, or Firm*—Brinks Hofer Gilson & Lione

(57) ABSTRACT

A liquid crystal composition including at least two kinds of gelling agents and a liquid crystal. The liquid crystal shows a liquid crystal phase at room temperature. A liquid crystal display device using the liquid crystal composition also is provided.

28 Claims, 5 Drawing Sheets

US 7,517,566 B2

LIQUID CRYSTAL COMPOSITION CONTAINING AT LEAST TWO KINDS OF GELLING AGENTS AND LIQUID CRYSTAL DISPLAY DEVICE USING THE SAME

This application is based on application(s) No. 2005-165263 and No. 2006-114154 filed in Japan, the contents of which are hereby incorporated by reference.

BACKGROUND OF THE INVENTION

1. Field of the Invention

The present invention relates to a liquid crystal composition and a liquid crystal display device using the same.

2. Description of the Related Art

Liquid crystal display devices using a chiral nematic liquid crystal composition containing a chiral material added into a nematic liquid crystal that forms a cholesteric phase at room temperature have been known. In such a liquid crystal display device, a chiral nematic liquid crystal composition is normally put and held between a pair of substrates having a transparent electrode, and the liquid crystal is displayed, by switching between the planer (PL) state and the focal conic (FC) or homeotropic (homeo) state by application of a pulse voltage (driving voltage) between the electrodes. In particular, a light having a particular peak wavelength is reflected selectively in the PL state.

A method of preparing a display device by adding a monomer and a polymerization initiator to a cholesteric liquid crystal composition and then polymerizing the monomer, for example, by irradiation of ultraviolet light (UV) was proposed (Nonpatent Literature 1) for monochromic displaying and expansion of view angle. However, the method caused a problem that the unreacted monomer remaining therein reacts gradually by ultraviolet light and resulted in deterioration in display performance during use of the element, because it was not possible to advance polymerization until there is no unreacted monomer any more even if the polymerization was carried out sufficiently.

In addition, methods of adding a gelling agent to a cholesteric liquid crystal composition for display superior in brightness and contrast were also known (Patent Documents 1 and 2). The methods would be expected to solve the problem of deterioration in display performance with time. However, in the liquid crystal display devices containing a gelling agent in cholesteric liquid crystal composition so far proposed, it was difficult to satisfy both whiteness and sufficient brightness during white display. For improvement in the whiteness during white display, it was necessary to adjust the helical pitch of cholesteric liquid crystal so that the selective reflection wavelength falls in the infrared range, and thus, in such a case, it was not possible to obtain a sufficiently bright display. On the contrary, if the helical pitch is so adjusted that the selective reflection wavelength of the cholesteric liquid crystal falls in the visible region, it is difficult to obtain favorable whiteness.

[Nonpatent Literature 1]: R. Q. Ma, et al., "SID 97 DIGEST", pp. 101 to 104

[Patent Document 1]: Japanese Patent Application Laid-Open No. 2004-226552

[Patent Document 2]: Japanese Patent Application Laid-Open No. 2005-91738

BRIEF SUMMARY OF THE INVENTION

An object of the present invention is to provide a liquid crystal composition allowing adjustment of its thermal properties and refractive index in proper ranges, and a liquid crystal display device using the same.

Another object of the present invention is to provide a liquid crystal composition having an expanded operating and storage temperatures range (improved in stability of display) and a liquid crystal display device containing the same.

Another object of the present invention is to provide a liquid crystal composition improved in whiteness and brightness during white display and a liquid crystal display device containing the same.

The present invention relates to a liquid crystal composition, comprising:

at least two kinds of gelling agents; and a liquid crystal showing a liquid crystal phase at room temperature.

DETAILED DESCRIPTION OF THE INVENTION

The present invention relates to a liquid crystal composition comprising a liquid crystal showing a liquid crystal phase at room temperature and at least two kinds of gelling agents, and a liquid crystal display device using the same.

[Effects of Invention]

(1) Control of Physical Properties (Thermal Properties, Refractive Index, etc.) of Liquid Crystal Composition Containing a Gelling Agent The gelling agent added to a liquid crystal should have proper values in various physical properties. For example as for thermal properties, it is necessary to set sol-gel transition temperature to a temperature higher than the operating temperature range of liquid crystal panel or lower than the injection temperature to the panel, or to set it to a temperature much higher or lower according to applications, in relation with the isotropic phase-transition temperature of liquid crystal. It is extremely difficult to prepare a new gelling agent having proper physical properties satisfying these requirements. However, in the present invention, it is possible to adjust the physical properties including thermal properties, refractive index, and others, by mixing at least two kinds of gelling agents.

(2) Expansion of the Operating and Storage Temperatures Range of Liquid Crystal Display Device (Improvement in Display Stability)

The network of the gelling agent is destroyed and the display characteristics deteriorate at a temperature of the sol-gel transition temperature or more. These are not recovered even after cooling. It is possible to form a more thermally stable network and raise the sol-gel transition temperature, by addition of at least two kinds of gelling agents. For example, when a gelling agent is added to a cholesteric liquid crystal, if the liquid crystal shows favorable display characteristics but has a lower sol-gel transition temperature only with one kind of gelling agent, it is possible to obtain favorable display characteristics and also to raise the sol-gel transition temperature to a temperature higher than its original liquid crystal by combined use of gelling agents higher in sol-gel transition temperature. That is, it is possible to adjust the sol-gel transition temperature of the liquid crystal to a temperature higher than the lower temperature among the sol-gel transition temperature Tsg A when a gelling agent A is used alone and the sol-gel transition temperature Tsg B when a gelling agent B is used alone, and more preferably to a temperature higher than both of Tsg A and Tsg B.

(3) Improvement in Whiteness and Brightness of Cholesteric Liquid Crystal Device During White Display It is possible to form a more complicated network than the case where a single gelling agent is used, and thus, to raise whiteness and/or brightness.

Figure 1:
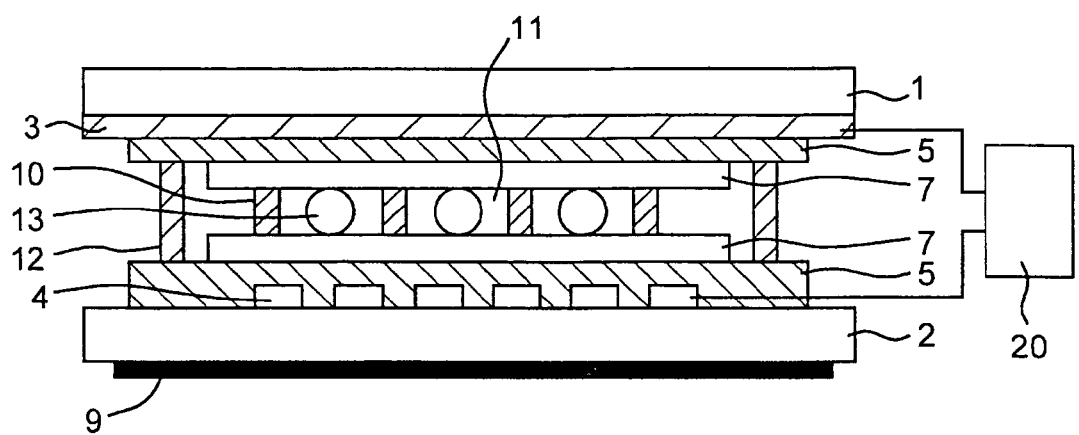
FIG. 1 is a schematic sectional view illustrating the liquid crystal display device of an embodiment of the present invention.

FIG. 1 is a schematic view illustrating the cross-sectional structure of the liquid crystal display device in an embodiment of the present invention. The liquid crystal display device shown in FIG. 1 has a structure in which a liquid crystal layer (liquid crystal composition) 11 is put and held between a pair of substrates 1 and 2. In FIG. 1, multiple belt-shaped transparent electrodes 3 and 4 in parallel with each other are formed on the surfaces of the substrates 1 and 2. The transparent electrodes 3 and 4 are facing each other in the crosswise direction. An insulation thin film 5 is coated on the electrodes 3 and 4. Further, an alignment film 7 is formed on the insulation thin film 5. The reference number 10 represents a polymer structure used as a member for supporting the space, and the reference number 13 represents a spacer similarly a member for supporting the space. The reference number 12 represents a sealing material for enclosing the liquid crystal composition 11 inside the cell. A black visible light-absorbing layer 9 is formed as needed on the outside face of the substrate 2 opposite to the incident light-side (rear face). A substrate 2 absorbing visible light may be used instead of forming the visible light-absorbing layer 9.

Hereinafter, main members for the liquid crystal display device will be described in detail.

(Liquid Crystal Layer)

The liquid crystal layer 11 is made of a liquid crystal composition containing a gelling agent in a liquid crystal. The liquid crystal is not particularly limited, when it is liquid crystalline at room temperature, and examples thereof include cholesteric liquid crystals and nematic liquid crystals. In the invention, when the liquid crystal is a cholesteric liquid crystal, the liquid crystal is preferably prepared by adjusting the components for the liquid crystal composition and the contents thereof so that the selective-reflection peak wavelength of the display device obtained becomes 500 to 700 nm, in particular 550 to 650 nm. A peak wavelength of less than 500 nm or more than 700 nm leads to deterioration in reflectance when the liquid crystal is planer, and also to deterioration in brightness during white display, making it difficult to keep the contrast high.

Cholesteric liquid crystals exhibit a cholesteric phase at room temperature, and, for example, a chiral nematic liquid crystal including a nematic liquid crystal and a chiral material may be used.

The nematic liquid crystal is not particularly limited, and nematic liquid crystals commonly used in liquid crystal display devices are usable. Examples of the nematic liquid crystal materials include liquid-crystalline ester compounds, liquid-crystalline pyrimidine compounds, liquid-crystalline cyanobiphenyl compounds, liquid-crystalline tolan compounds, liquid-crystalline phenylcyclohexane compounds, liquid-crystalline terphenyl compounds, and other liquid-crystalline compounds containing a polar group such as a fluorine atom, a fluoroalkyl group, or a cyano group, the mixtures thereof, and the like.

Any one of various chiral materials commonly used in the field of liquid crystal display devices may be used as chiral materials. Examples thereof include cholesteric compounds having a cholesteric ring, biphenyl compounds having a biphenyl skeleton, terphenyl compounds having a terphenyl skeleton, ester compounds having a skeleton of two benzene rings connected to each other via an ester bond, cyclohexane compounds having a skeleton of a cyclohexane ring directly connected to a benzene ring, pyrimidine compounds having a skeleton of a pyrimidine ring directly connected to a benzene ring, azoxy or azo compounds having a skeleton of two benzene rings connected to each other via an azoxy or azo bond, and the like.

Examples of the chiral materials include compounds represented by the following Chemical Formulae (C1) to (C7), and the like.

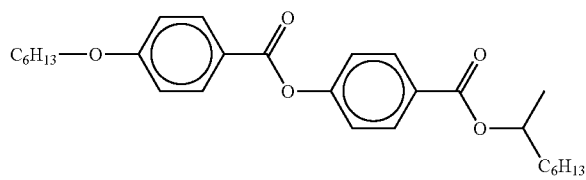

(C1)

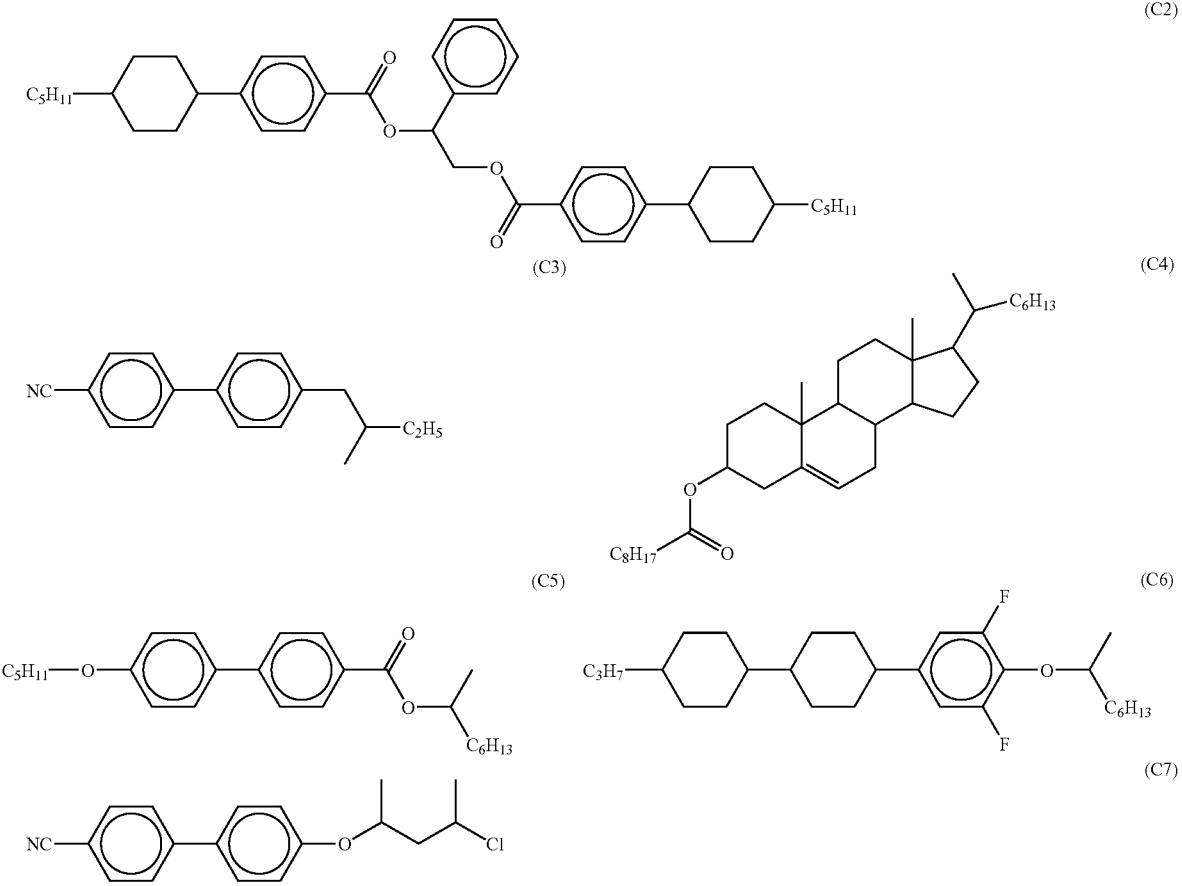

The content of the chiral material is not particularly limited, and normally 3 to 40% by mass with respect to the total amount of the liquid crystal composition.

In the present embodiment, at least two kinds, preferably 2 to 3 kinds, of gelling agents different in structure are used as gelling agents. Presence of at least two kinds of gelling agents different in structure raises the whiteness of the liquid crystal display device during white display distinctively. For example, if the whiteness of a liquid crystal display device using only a gelling agent A is designated as $D_A$ when it is planer and the whiteness of a liquid crystal display device using only a gelling agent B as $D_B$ ($\neq D_A$), it is possible to control the whiteness of a liquid crystal display device to be smaller than the smallest of $D_A$ and $D_B$, by adding gelling agents A and B to the liquid crystal composition. Further, for example, if the whiteness of a liquid crystal display device using a gelling agent C alone as a gelling agent is designated as $D_C$, it is possible to control the whiteness of a liquid crystal display device to be smaller than the smallest of $D_A$, $D_B$ and $D_C$, by adding the gelling agents A to C to the liquid crystal composition. Although the detail mechanism is not clear, it seems that combined use thereof is effective in forming a complicated network than use of a gelling agent alone, and, as a result, in preventing alignment of the helical axes of the cholesteric liquid crystals in one direction in the planer state, and thus in expanding the wavelength region allowing selective reflection. Increase of the light scattering among the liquid crystal domains and the light scattering due to the difference in refractive index between the gelling agent and the liquid crystal seem to be partly-responsible. The $D_A$, $D_B$ and $D_C$, which represent respectively a degree of whiteness, show a distances (d) from standard white light D65 on the chromaticity coordinate, as described in detali later. The smaller the value is, the whiter the color is.

At least two kinds of gelling agents used in combination are, for example, those containing plural alkyl or alkylene groups in the molecule of which the carbon chain lengths are different from each other, preferably those of which the lengths of at least one carbon chain of the alkyl or alkylene groups are different from each other, and more preferably those of which the difference is 4 or more are more. Alternatively, at leaset one kind of gelling agents containing a siloxane skeleton and at least one kind of gelling agents not containing it in the molecule may be used in combination. As the one containing the siloxane skeleton and the one not containing the siloxane skeleton are different in refractive index, the formed network generates distribution in refractive index and the whiteness degree can be further improved.

In the present embodiment, among at least two kinds of gelling agents, at least one, preferably all, gelling agent is preferably a self-organizing type gelling agent, from the viewpoint of the stability in device display performance. The self-organizing type gelling agent is specifically a gelling agent that organizes itself and forms a pseudo-network structure by itself, only by addition and mixing of the gelling agent without any other means such as UV irradiation. Such a gelling agent molecule can be easily dispersed uniformly in liquid crystal compositions at a molecule level and forms a pseudo-network structure by hydrogen bonding, and thus, the network structure formed has higher denseness and favorable flexibility.

The self-organizing type gelling agent is an organic compound forming hydrogen bonds intramolecularly, and examples thereof include organic compounds at least containing an intermolecular hydrogen-bonding group, preferably organic compounds having an intermolecular hydrogen-bonding group and a saturated aliphatic hydrocarbon group. Use of an organic compound having an intermolecular hydrogen-bonding group and a saturated aliphatic hydrocarbon group together as a gelling agent accelerates pseudo-network structure formation, by the intermolecular force among the saturated aliphatic hydrocarbon groups.

The intermolecular hydrogen-bonding group is not particularly limited, when it can form a hydrogen bond intermolecularly with the same group, and examples thereof include an amide bond group (—NHCO—), an ester bond group (—COO—) and the like. One or more, preferably two or more, intermolecular hydrogen-bonding groups are preferably contained in the molecule. The saturated aliphatic hydrocarbon group is a long-chain alkyl or alkylene group, and more specifically, a saturated hydrocarbon group having 4 or more, particularly 4 to 20, preferably 6 to 20 carbon atoms. The saturated aliphatic hydrocarbon group is preferably straight, and desirably one or more, preferably two or more are contained in the molecule.

Specifically, a preferable self-organizing type. gelling agent has a molecular structure consisting of an intermolecular binding group-containing unit and a remainder unit that contains the saturated aliphatic hydrocarbon group described above.

The intermolecular binding group-containing unit in the self-organizing type gelling agent is not particularly limited, if it has an intermolecular binding group, but preferably has a skeleton represented by General Formula (1), for further improvement in whiteness.

(1)

In General Formula (1), $B_1$ and $B_2$ each independently represent an intermolecular hydrogen-bonding group, specifically —CONH—, —NHCO—, —COO— or —OCO—. However, at least one of $B_1$ and $B_2$ is —CONH— or —NHCO—. Preferably, $B_1$ and $B_2$ each independently represent —CONH— or —NHCO—.

The character b represents the carbon number of the carbon chain connecting between $B_1$ and $B_2$, and is a natural number of 5 or less, preferably 1 to 3, more preferably 1 or 2. The carbon atoms between $B_1$ and $B_2$ may bind to any atom or group (see General Formula (2) below). At least part of the carbon atoms between $B_1$ and $B_2$ may bind to carbon atoms other than the carbon atoms between $B_1$ and $B_2$, forming a ring (see General Formula (4) below). In addition, —$B_1$—(C)$_b$—$B_2$— itself may bind to other carbon atoms, forming a ring (see General Formula (3) below).

Typical examples of the intermolecular binding group-containing units having a skeleton represented by General Formula (1) include groups represented by General Formulae (2), (3) and (4). The self-organizing type gelling agent has a group represented by any one of the General Formulae.

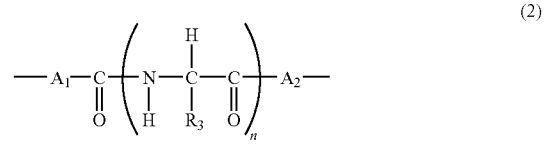
(2)

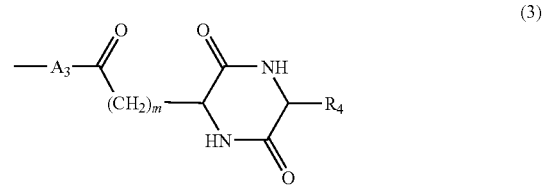
(3)

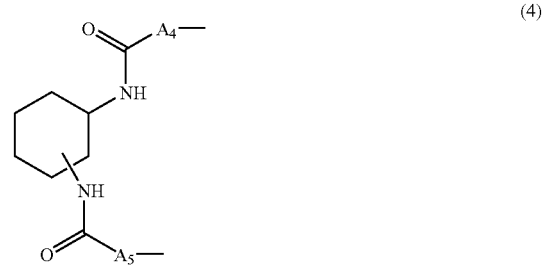
(4)

In General Formula (2), $A_1$ and $A_2$ each independently represent —O—, —NH— or a single bond (—). Preferably, $A_1$ is —O— or a single bond. Preferable $A_2$ is —NH—.

$R_3$ represents an alkyl group having 1 to 20 carbon atoms, a benzyl group, —(CH$_2$)$_a$—COO—Re$_8$, —(CH$_2$)$_a$—OCO—Re$_8$, —(CH$_2$)$_a$—CONH—Re$_8$, —(CH$_2$)$_a$—NHCO—Re$_8$, —(CH$_2$)$_a$—NHCONH—Re$_8$, —(CH$_2$)$_a$—NHCOO—Re$_8$, —(CH$_2$)$_a$—OCONH—Re$_8$, or —(CH$_2$)$_a$—S—Re$_8$. In the Formulae above, a is a natural number of 5 or less; and Re$_8$ represents an alkyl group having 1 to 20 carbon atoms. Preferable $R_3$ is an alkyl group having 1 to 10 carbon atoms, particularly 1 to 4 carbon atoms (for example, methyl, ethyl, n- or iso-propyl, n-, sec- or tert-butyl, n-pentyl, n-hexyl, n-heptyl, n-octyl, n-nonyl, n-decyl, etc.), —(CH$_2$)$_a$—CONH—Re$_8$, —(CH$_2$)$_a$—NHCO—Re$_8$, —(CH$_2$)$_a$—NHCONH—Re$_8$, or —(CH$_2$)$_a$—NHCOO—Re$_8$; and, in particular when $A_2$ is —O—, $R_3$ is preferably —(CH$_2$)$_a$—CONH—Re$_8$, —(CH$_2$)$_a$—NHCO—Re$_8$, —(CH$_2$)$_a$—NHCONH—Re$_8$, or —(CH$_2$)$_a$—NHCOO—Re$_8$. Preferably in $R_3$, a is a natural number of 5 or less; and Re$_8$ is a straight-chain alkyl group having 10 to 20 carbon atoms.

n is a natural number of 5 or less, preferably a natural number of 1 to 3.

In General Formula (3), $A_3$ is the same as $A_1$ and $A_2$ in General Formula (2). Preferably, $A_3$ is —O—.

$R_4$ is the same as $R_3$ in General Formula (2). $R_4$ is preferably an alkyl group having 1 to 10 carbon atoms, particularly 1 to 4 carbon atoms (for example, methyl, ethyl, n- or iso-propyl, n-, sec- or tert-butyl, n-pentyl, n-hexyl, n-heptyl, n-octyl, n-nonyl, n-decyl, etc.), or a benzyl group.

The character m represents the same as n in General Formula (2). Preferable m is a natural number of 1 to 3, particularly 1.

In General Formula (4), each of $A_4$ and $A_5$ is independently the same as $A_1$ or $A_2$ in General Formula (2). Preferable $A_4$ and $A_5$ are a single bond.

Examples of the self-organizing type gelling agents having an intermolecular binding group-containing unit represented by General Formula (2) include compounds represented by General Formulae (2a), (2b), (2c), and (2d).

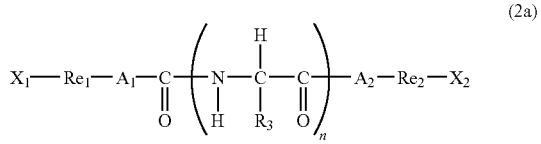

(2a)

In General Formula (2a), $A_1$, $A_2$, $R_3$ and n are respectively the same as those in General Formula (2). Preferable $A_1$, $A_2$, $R_3$ and n are the same as those in General Formula (2).

$X_1$ and $X_2$ each independently represent a hydrogen atom, a vinyl group, a phenyl group, a biphenyl group, a phenyloxy group, or a biphenyloxy group, or a monovalent group having a siloxane skeleton. In the present specification, the monovalent group having a siloxane skeleton is a residue of the polysiloxane represented by $H_3SiO(H_2SiO)_pSiH_3$ (wherein, p is a natural number of 1 to 30, particularly 1) from which any one of hydrogen atom is removed. The phenyl group, the biphenyl group, the phenyloxy group, the biphenyloxy group, and the monovalent group having a siloxane skeleton may may have a substituent, and examples of the substituent groups include alkyl groups having 1 to 3 carbon atoms, particularly 1 to 2 carbon atoms, (such as methyl, ethyl, n-propyl and iso-propyl groups), a cyano group, and the like. $X_1$ is preferably a hydrogen atom, a vinyl group, a phenyl group, or a biphenyl group, or a monovalent group having a siloxane skeleton, and more preferably, a vinyl group, a phenyl group, or a monovalent group having a siloxane skeleton. Preferabe $X_2$ is a hydrogen atom.

$Re_1$ and $Re_2$ each independently represent an alkylene group, particularly a straight-chain alkylene group, having 1 to 20 carbon atoms. Preferable $Re_1$ is a straight-chain alkylene group having 1 to 10 carbon atoms. Preferable $Re_2$ is a straight-chain alkylene group having 11 to 18 carbon atoms.

However, at least one of $Re_1$ and $Re_2$ is an alkylene group, particularly a straight-chain alkylene group, having 4 or more carbon atoms, particularly 4 to 20 carbon atoms, preferably 6 to 20 carbon atoms.

Typical examples of the gelling agents represented by General Formula (2a) include, among the typical examples below, gelling agents (G1) to (G10), (G12) to (G15), (G30) to (G32), (G35) to (G38), and (G40), and the like.

In General Formula (2b), $A_1$, $A_2$, $R_3$ and n are respectively the same as those in General Formula (2). Preferable $A_1$, $A_2$, $R_3$ and n are the same as those in General Formula (2).

$X_1$ and $Re_1$ are respectively the same as those in General Formula (2a). Preferable $X_1$ and $Re_1$ are also the same as those in General Formula (2a).

$Re_3$ represents an alkylene group, particularly a straight-chain alkylene group, having 1 to 20 carbon atoms. Preferable $Re_3$ is a straight-chain alkylene group having 11 to 18 carbon atoms.

However, at least one of two $Re_1$s and $Re_3$ in the molecule is an alkylene group, particularly a straight-chain alkylene group, having 4 or more carbon atoms, particularly 4 to 20 carbon atoms, preferably 6 to 20 carbon atoms.

In General Formula (2b), two or more groups present and n are independently selected in predetermined ranges.

Typical examples of the gelling agents represented by General Formula (2b) include, among the typical examples below, a gelling agent (G11), and the like.

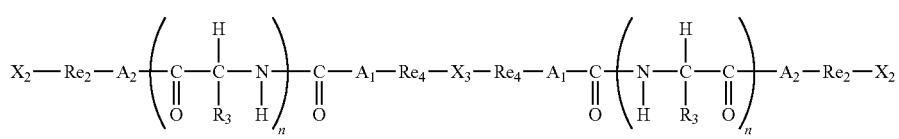

(2c)

In General Formula (2c), $A_1$, $A_2$, $R_3$ and n are respectively the same as those in General Formula (2). Preferable $A_1$, $A_2$, $R_3$ and n are also the same as those in General Formula (2).

$X_2$ and $Re_2$ are respectively the same as those in General Formula (2a). Preferable $X_2$ and $Re_2$ are also the same as those in General Formula (2a).

$Re_4$ represents an alkylene group, particularly a straight-chain alkylene group, having 1 to 20 carbon atoms. Preferable $Re_4$ represents a straight-chain alkylene group having 4 to 10 carbon atoms.

However, at least one of the two $Re_2$s and two $Re_4$s in the molecule is an alkylene group, particularly a straight-chain alkylene group, having 4 or more carbon atom, particularly 4 to 20 carbon atoms, preferably 6 to 20 carbon atoms.

$X_3$ represents an alkylene group, particularly a straight-chain alkylene group, having 1 to 20 carbon atoms or a bivalent group having a siloxane skeleton. In the present specification, the bivalent group having a siloxane skeleton is a residue of the polysiloxane represented by $H_3SiO(H_2SiO)_qSiH_3$ (wherein, q is a natural number of 1 to 5, particularly 1-2) from which two hydrogen atoms are removed. The bivalent group having a siloxane skeleton may have a substituent, and examples of the substituent groups include an alkyl group having 1 to 3 carbon atoms, particularly 1 to 2 carbon atoms, (such as methyl, ethyl, n-propyl and iso-propyl groups), and

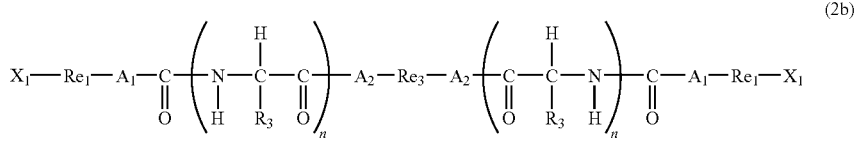

(2b)

the like. Preferable $X_3$ is a bivalent group having a siloxane skeleton, more preferably having a substituent group such as a methyl group.

In General Formula (2c), two or more groups present and n are independently selected in predetermined ranges.

Typical examples of the gelling agents represented by General Formula (2c) include gelling agent (G34) and the like, among typical examples below.

$X_4$ is the same as $X_1$ and $X_2$ in General Formula (2a). Preferable $X_4$ is a hydrogen atom or a monovalent group having a siloxane skeleton.

$Re_5$ represents an alkylene group, particularly a straight-chain alkylene group, having 4 to 20 carbon atoms. Preferable $Re_5$ is an alkylene group, particularly a straight-chain alkylene group, having 5 to 15 carbon atoms.

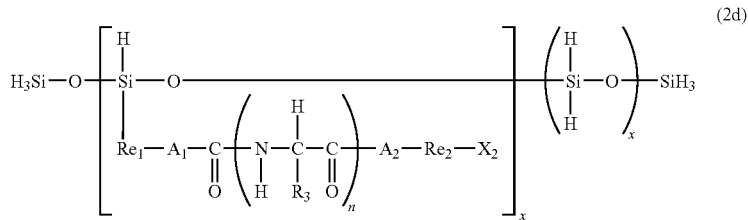

(2d)

In General Formula (2d), $A_1$, $A_2$, $R_3$ and n are respectively the same as those in General Formula (2). Preferable $A_1$, $A_2$, $R_3$ and n are also respectively the same as those in General Formula (2).

$Re_1$, $Re_2$ and $X_2$ are respectively the same as those in General Formula (2a). Preferable $Re_1$, $Re_2$ and $X_2$ are also respectively the same as those in General Formula (2a).

However, at least one of $Re_1$ and $Re_2$ is an alkylene group, particularly a straight-chain alkylene group, having 4 or more carbon atoms, particularly 4 to 20 carbon atoms, preferably having 6 to 20 carbon atoms.

In the polymeric compound represented by General Formula (2d), it is preferable that x is about 1 to 35, and y is about 0 to 25.

In General Formula (2d), the hydrogen atom bound to Si may be substituted with an alkyl group. Also in General Formula (2d), each of x and y represents the ratio of a partial structure in the molecule, and these partial structures may be regular or irregular.

Typical examples of the gelling agents represented by General Formula (2d) include the compounds wherein $Re_1$ is an alkylene group having 5 to 15 carbon atoms; $A_1$ is —O—; $R_3$ is an alkyl group having 1 to 5 carbon atoms; $A_2$ is a single bond; $Re_2$ is an alkylene group having 10 to 20 carbon atoms; $X_2$ is a hydrogen atom; n is 1; x is 5 to 9; y is 4 to 8; and the hydrogen atoms bound to Si are all substituted with a methyl group.

Examples of the self-organizing type gelling agents having an intermolecular binding group-containing unit represented by General Formula (3) include the compounds represented by General Formula (3a).

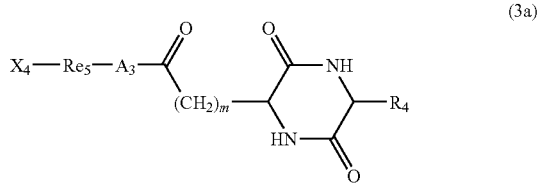

(3a)

In General Formula (3a), $A_3$, $R_4$ and m are respectively the same as those in General Formula (3). Preferable $A_3$, $R_4$ and m are also the same as those in General Formula (3).

Typical examples of the gelling agents represented by General Formula (3a) include, among typical examples below, gelling agents (G16) to (G17), (G33) and (G39), and the like.

Examples of the self-organizing type gelling agents having an intermolecular binding group-containing unit represented by General Formula (4) include the compounds represented by General Formula (4a).

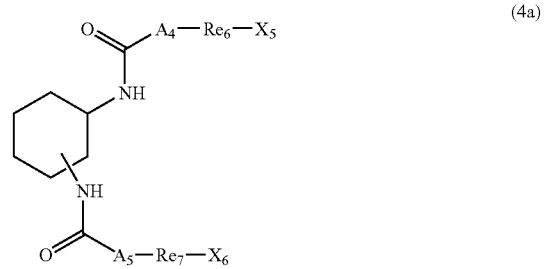

(4a)

In General Formula (4a), $A_4$ and $A_5$ are respectively the same as those in General Formula (4). Preferable $A_4$ and $A_5$ are also the same as those in General Formula (4).

$X_5$ and $X_6$ are respectively the same as $X_1$ and $X_2$ in General Formula (2a). Preferable $X_5$ and $X_6$ each independently represent a hydrogen atom, a biphenyloxy group or a monovalent group having a siloxane skeleton, more preferably a hydrogen atom.

$Re_6$ and $Re_7$ each independently represent an alkylene group, particularly a straight-chain alkylene group, having 1 to 20 carbon atoms. Preferable $Re_6$ and $Re_7$ each independently represent an alkylene group, particularly a straight-chain alkylene group, having 5 to 15 carbon atoms, and more preferably a straight-chain alkylene group having 10 to 15 carbon atoms.

However, at least one of $Re_6$ and $Re_7$ in the molecule is an alkylene group, particularly a straight-chain alkylene group, having 4 or more carbon atoms, particularly 4 to 20 carbon atoms, preferably having 6 to 20 carbon atoms.

Typical examples of the gelling agents represented by General Formula (4a) include, among typical examples below, gelling agents (G19) to (G29), and the like.

When at least two kinds of the self-organizing type gelling agents are used in combination, those self-organizing type gelling agents are different from each other in at least a partial structure of the intermolecular binding group-containing unit or/and the remaining unit.

In the present embodiment, the at least two kinds of self-organizing type gelling agents are preferably different from each other at least in the remaining unit. Specifically, the at least two kinds of self-organizing type gelling agents are preferably different from each other, in that the carbon numbers of the saturated aliphatic hydrocarbon groups in the respective remaining units are different by 4 or more, particularly 4 to 20, from each other and/or in whether the remaining unit contains a siloxane skeleton, for improvement in whiteness and increase in sol-gel transition temperature.

Figure 5:
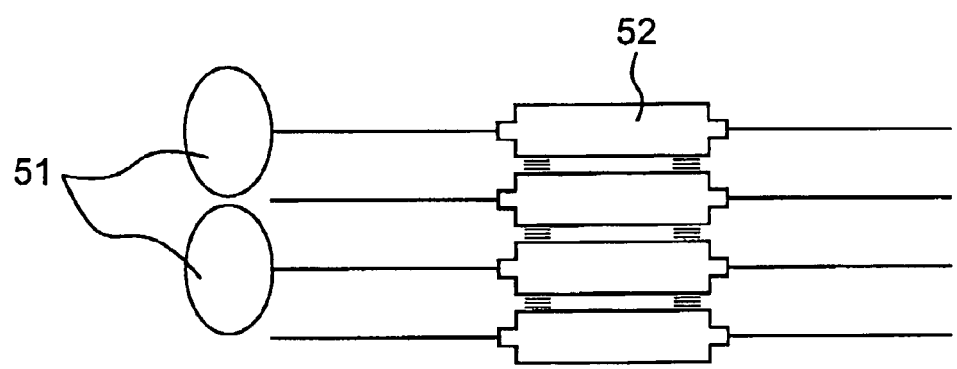
FIG. 5 is a schematic sectional view showing behavior of a gelling agent in one example of a liquid crystal composition of the present invention.

For example, it is possible to improve the whiteness further and increase the sol-gel transition temperature further, by using at least one kind of self-organizing type gelling agent containing a siloxane skeleton in the molecule and at least one kind of self-organizing type gelling agent containing no siloxane skeleton in the molecule in combination. Self-organizing type gelling agents containing and not containing a siloxane skeleton are different from each other in refractive index, and thus, cause a certain refractive index distribution in the network formed and improve the whiteness thereof further. For example as shown in FIG. 5, combined use of self-organizing type gelling agents containing and not containing a siloxane skeleton 51 results in alleviation of the steric hindrance among bulky siloxane skeletons 51 in the network formed, and thus, in improvement in packing of the gelling agent molecules, which, in turn, leads to enhancement of the intermolecular interaction among gelling agent molecules and increase in the sol-gel transition temperature. In FIG. 5, 52 represents the intermolecular hydrogen-bonding group-containing unit in the gelling agent.

Typical examples of the self-organizing type gelling agents containing a siloxane skeleton in the molecule include, among typical examples below, G28 to G40, and the like. The number corresponds to that of the typical example of gelling agent described below (the same shall apply hereinafter).

Typical examples of the self-organizing type gelling agents containing no siloxane skeleton in the molecule include, among typical examples below, G1 to G27, and the like.

Figure 6:
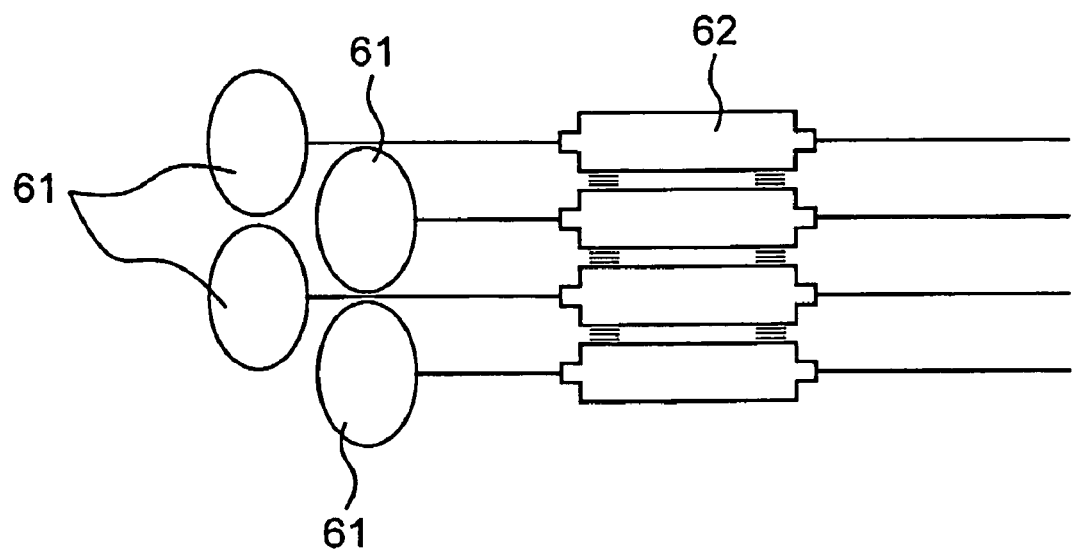
FIG. 6 is a schematic sectional view showing behavior of a gelling agent in one example of a liquid crystal composition of the present invention.

For example when the at least two kinds of gelling agents used are self-organizing type gelling agents containing a siloxane skeleton in the molecule, the saturated aliphatic hydrocarbon groups in the respective remaining units of the at least two kinds of self-organizing type gelling agents preferably have carbon numbers different from each other by 4 or more, particularly 4 to 20. In this way, it is possible to increase the sol-gel transition temperature. Combined use of the gelling agents containing a siloxane skeleton results in greater steric hindrance among bulky siloxane skeletons in the network formed and thus, in insufficient packing of the gelling agent molecules. As shown in FIG. 6, by changing the number of carbons connecting the saturated aliphatic hydrocarbon group, i.e., the alkylene main chain connecting the intermolecular hydrogen-bonding group-containing unit to the siloxane skeleton, in the remaining unit, it is possible to change the distance between the intermolecular hydrogen-bonding group-containing unit 62 and the siloxane skeleton 61, and thus to regulate the steric hindrance among siloxane skeletons 61 and increase the sol-gel transition temperature.

Such combinations of the gelling agents include, for example, the followings:
G35 and G36
G35 and G37
G35 and G38
G35 and G40
G35 and G31
G30 and G31

Figure 7:
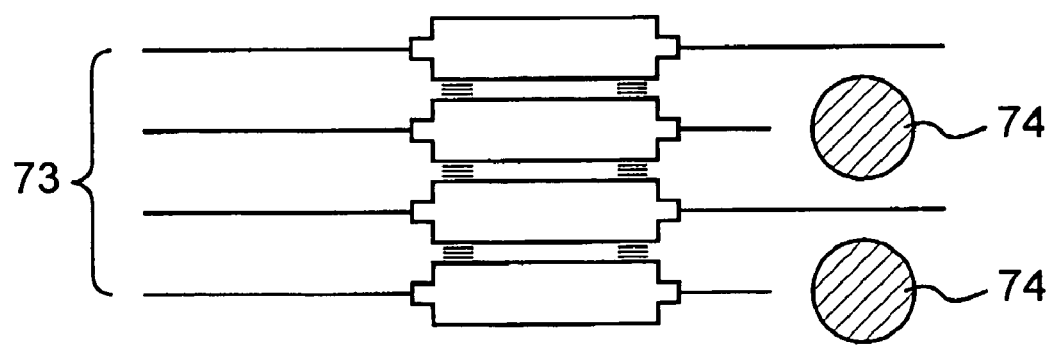
FIG. 7 is a schematic sectional view showing behavior of a gelling agent in one example of a liquid crystal composition of the present invention.

For example when the at least two kinds of gelling agents are both self-organizing type gelling agents containing an alkyl group in the molecule, the carbon numbers of the respective alkyl groups are preferably different from each other by 4 or more, particularly 4 to 20. In this way, it is possible to improve the whiteness further. As shown in FIG. 7, difference in the carbon numbers of the alkyl groups leads to generation of alternating or randomly distributed spaces 74 among the gelling agent molecules 73, which prohibit excessively dense packing of the gelling agent molecules and generation of thick fibrous structure by complexation of the gelling agent molecules, and allow generation of a finer network. As a result, the orientation of liquid crystal is disturbed, and consequently, the liquid crystal gives whiter display.

The alkyl group present in the molecule of the self-organizing type gelling agent is, for example, a $X_1$—$Re_1$— group when $X_1$ in the gelling agent represented by General Formula (2a) or (2b) is H; a $X_2$—$Re_2$— group when $X_2$ in the gelling agent represented by General Formula (2a), (2c) or (2d) is H; a $X_4$—$Re_5$— group when $X_4$ in the gelling agent represented by General Formula (3a) is H; a $X_5$—$Re_6$— group when $X_5$ in the gelling agent represented by General Formula (4a) is H; and a $X_6$—$Re_7$— group when $X_6$ in the gelling agent represented by General Formula (4a) is H.

Such combinations of the gelling agents include, for example, the followings: The number corresponds to that of the typical example of gelling agent described below.
G21 and G22
G6 and G8
G7 and G8
G19 and G20
G19 and G21
G19 and G22

On the other hand, the intermolecular hydrogen-bonding group-containing units in the at least two kinds of self-organizing type gelling agents are preferably similar to each other. That is, when the intermolecular hydrogen-bonding group-containing units contain, for example, two or more amide bond groups (—NHCO—), the directions of the amide bond groups (for example, directions of the amide bond group in —CONH—$CH_2$—CONH— and —CONH—$CH_2$—NHCO— are different) and/or the lengths of the carbon chains between the amide bond groups are preferably the same. Specifically, for example in the skeleton represented by General Formula (1), preferably, the groups $B_1$ are the same and the groups $B_2$ are the same as each other in respective gelling agents, and/or the b values of respective gelling agents are the same each other. In particular, the intermolecular hydrogen-bonding group-containing units in the at least two kinds of self-organizing type gelling agents preferably have such a degree of similarity that they can all be represented by any one of General Formulae (2), (3) and (4).

The at least two kinds of self-organizing type gelling agents used are more preferably similar to each other as entire molecule, for increase in sol-gel transition temperature. Thus, all of the at least two kinds of self-organizing type gelling agents are more preferably compounds represented by any one of General Formulae (2a), (2b), (2c), (2d), (3a) and (4a), particularly represented by any one of General Formulae (2a), (3a) and (4a). When the at least two kinds of self-organizing type gelling agents are similar in the structure as entire molecule, the intermolecular bonds formed among the gelling agents are stronger, and the multiple gelling agents form a self-organized network relatively higher in order, as they are placed alternately or randomly. Increase in the intermolecular interaction among the gelling agent molecules by the enhanced packing efficiency seems to be the cause of the increase in the sol-gel transition temperature.

When the at least two kinds of self-organizing type gelling agents represented by any one of General Formulae (2a), (2b), (2c), (2d), (3a) and (4a) are used, the gelling agents are different from each other at least in the partial structures of the intermolecular binding group-containing units or/and the remaining units thereof as described above; but, preferably for improvement in whiteness and increase in sol-gel transition temperature, the carbon numbers of the saturated aliphatic hydrocarbon groups in the respective remaining units are different from each other, and/or there is a difference in whether there is a siloxane skeleton contained in the remaining units.

Specifically, for example when at least two kinds of the self-organizing type gelling agents represented by General Formula (2a) are used, the gelling agents are preferably different from each other in the carbon numbers of $Re_1$ and/or $Re_2$, in particular $Re_1$, by 4 or more, particularly 4 to 20, and/or in whether there is a siloxane skeleton contained in $X_1$ and/or $X_2$, in particular $X_1$.

For example when at least two kinds of the self-organizing type gelling agents represented by General Formula (2b) are used, the gelling agents are different from each other in the carbon numbers of $Re_1$ and/or $Re_3$ by 4 or more, particularly 4 to 20, and/or in whether there is a siloxane skeleton contained in $X_1$.

For example when at least two kinds of the self-organizing type gelling agents represented by General Formula (2c) are used, the gelling agents are different from each other in the carbon numbers of $Re_2$ and/or $Re_4$ by 4 or more, particularly 4 to 20, and/or in whether there is a siloxane skeleton contained in $X_2$ and/or $X_3$.

For example when at least two kinds of the self-organizing type gelling agents represented by General Formula (2d) are used, the gelling agents are different from each other in the carbon numbers of $Re_1$ and/or $Re_2$ by 4 or more, particularly 4 to 20, and/or in whether there is a siloxane skeleton contained in $X_1$.

For example when at least two kinds of the self-organizing type gelling agents represented by General Formula (3a) are used, the gelling agents are different from each other in the carbon numbers of $Re_5$ by 4 or more, particularly 4 to 20, and/or in whether there is a siloxane skeleton contained in $X_4$.

For example when at least two kinds of the self-organizing type gelling agents represented by General Formula (4a) are used, the gelling agents are different from each other in the carbon numbers of $Re_6$ and/or $Re_7$ by 4 or more, particularly 4 to 20, and/or in whether there is a siloxane skeleton contained in $X_5$ and/or $X_6$.

Typical examples of the gelling agents include compounds represented by the following Chemical Formulae (G1) to (G40), and the like.

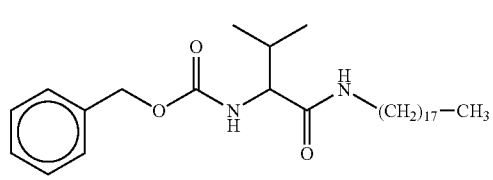

(G1)

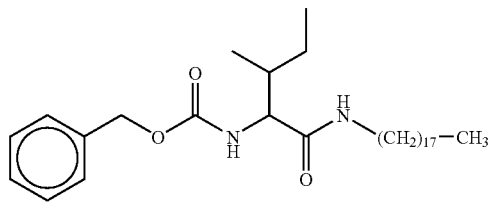

(G2)

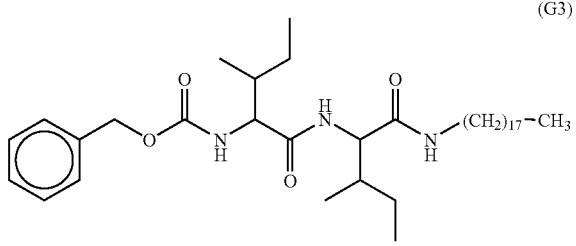

(G3)

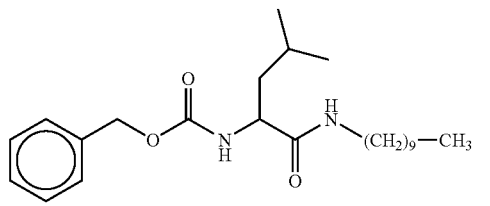

(G4)

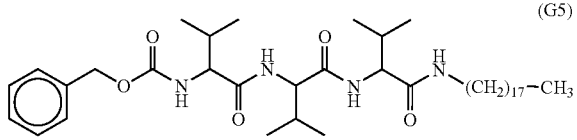

(G5)

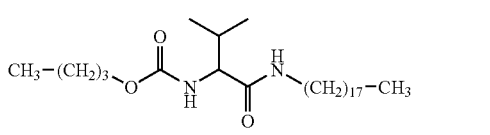

(G6)

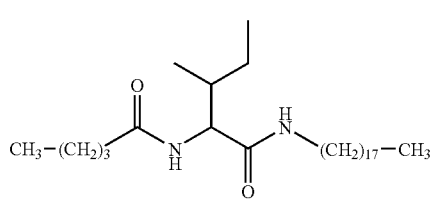

(G7)

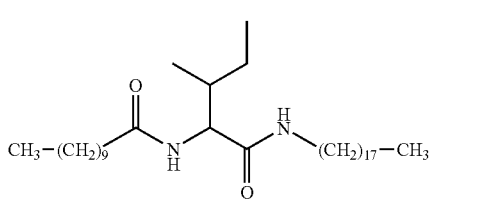

(G8)

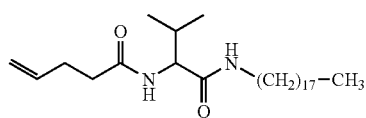

(G9)

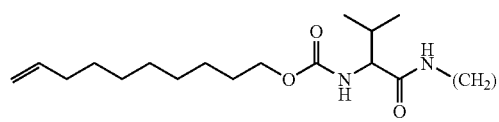

(G10)

-continued
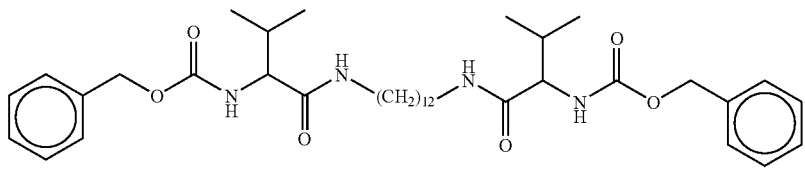
(G11)
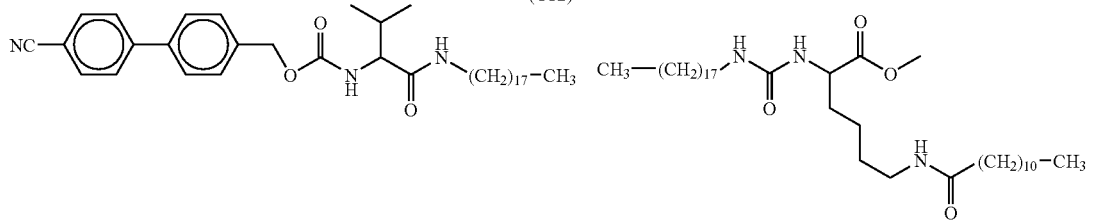
(G12) (G13)
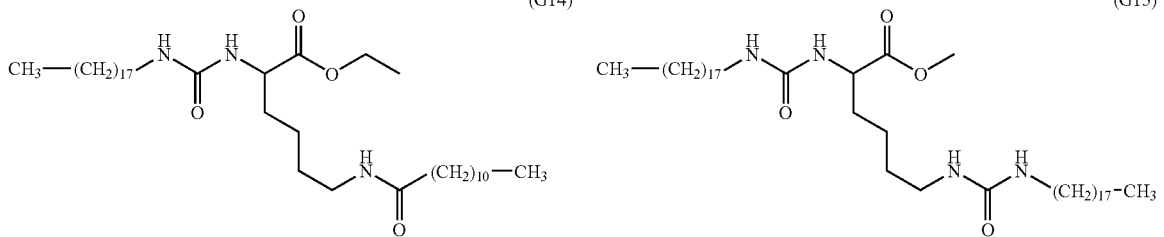
(G14) (G15)
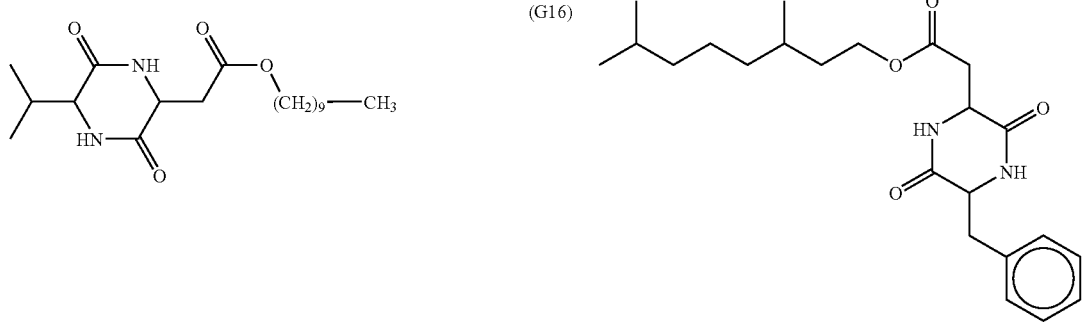
(G16) (G17)
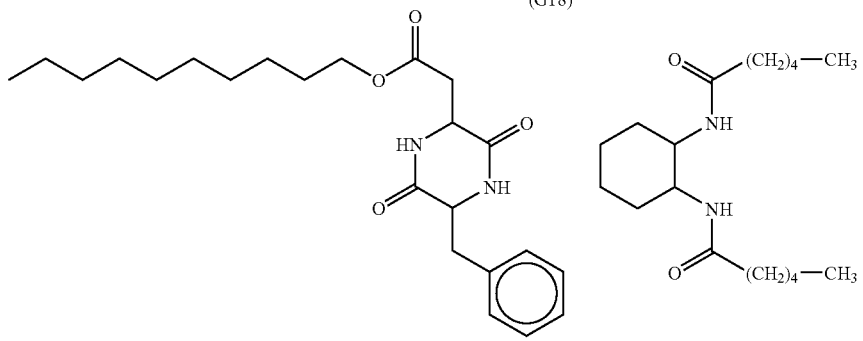
(G18) (G19)
(G20) (G21)

-continued
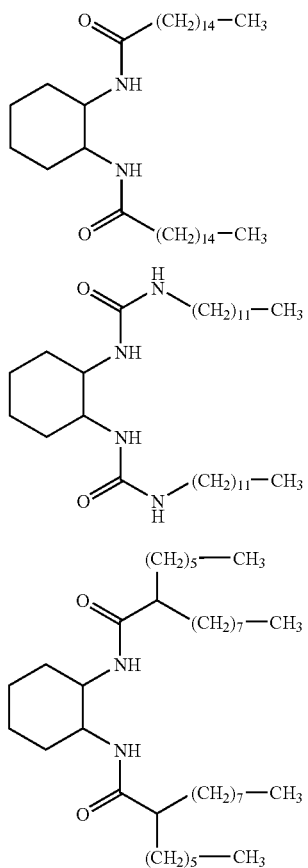
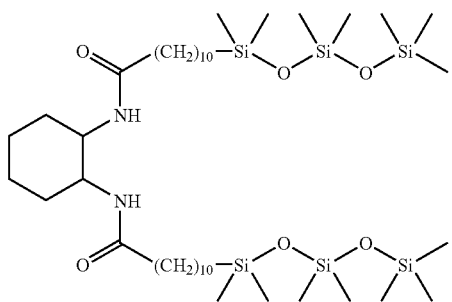
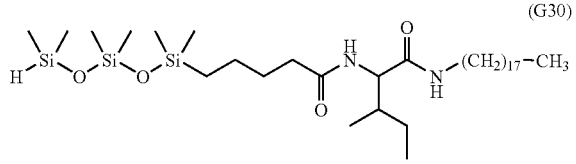
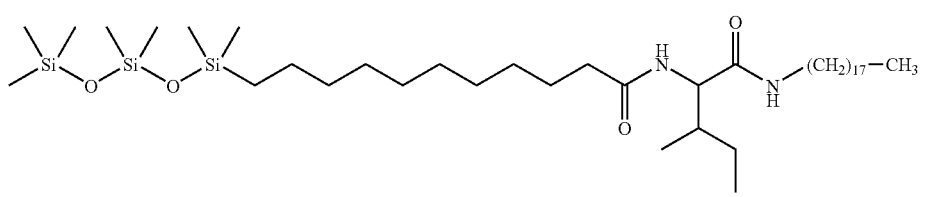
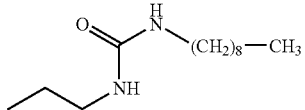
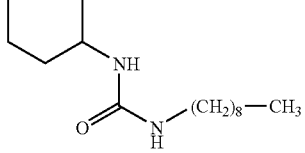
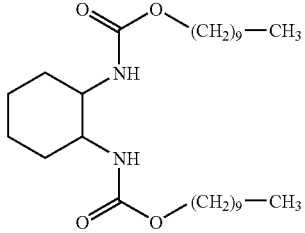
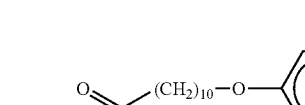
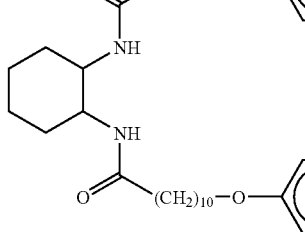
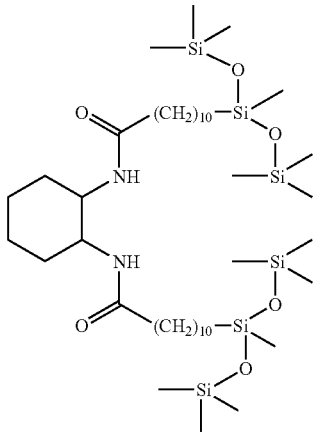

-continued
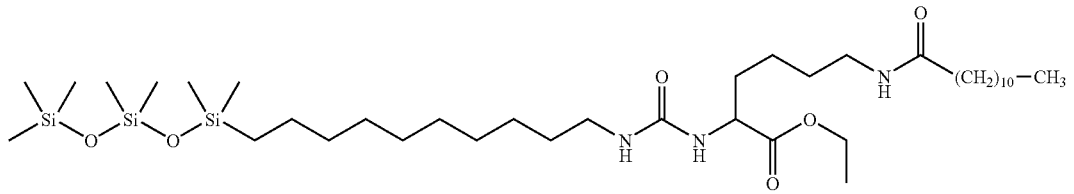
(G32)
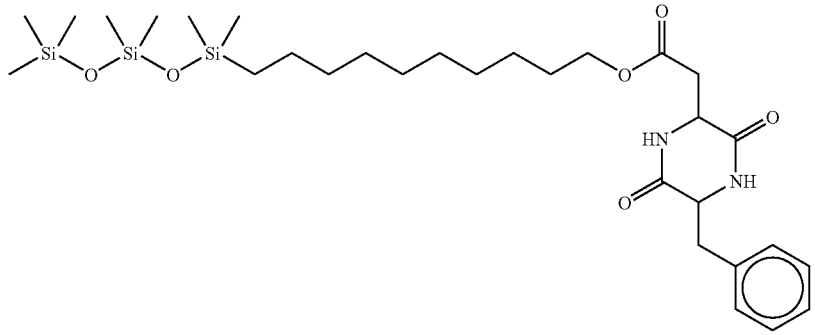
(G33)
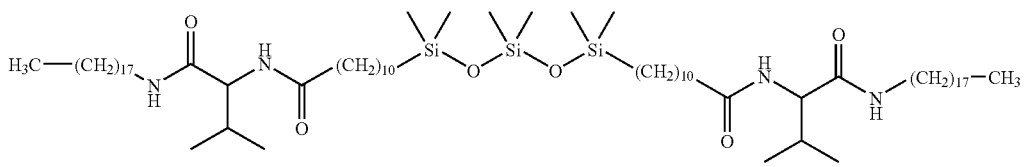
(G34)
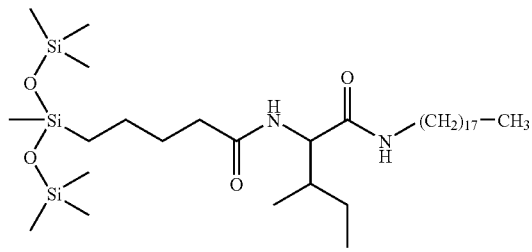
(G35)
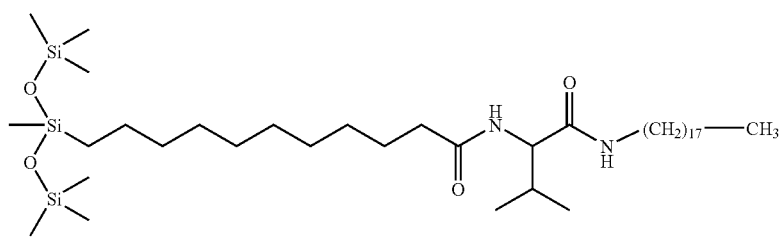
(G36)
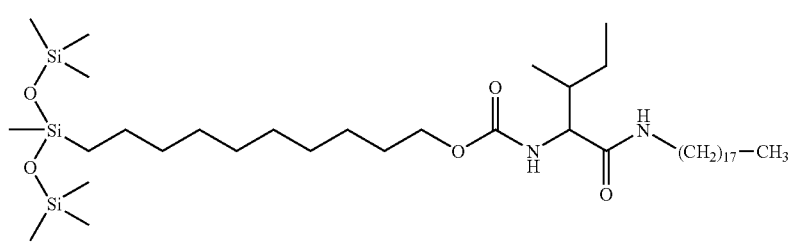
(G37)

-continued

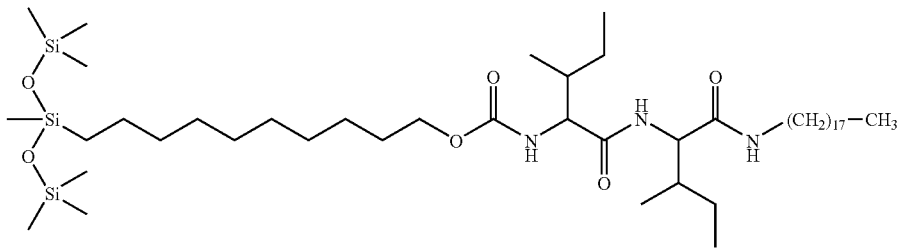
(G38)

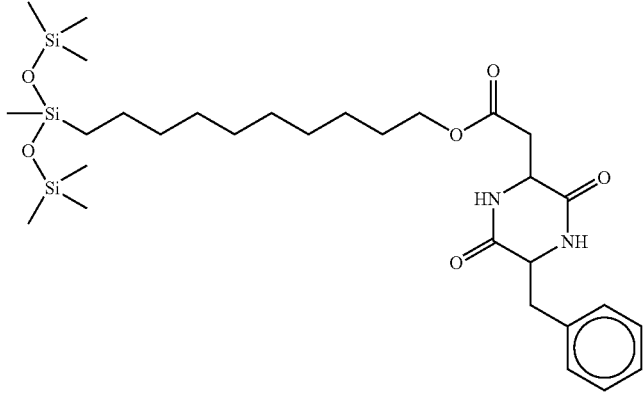
(G39)

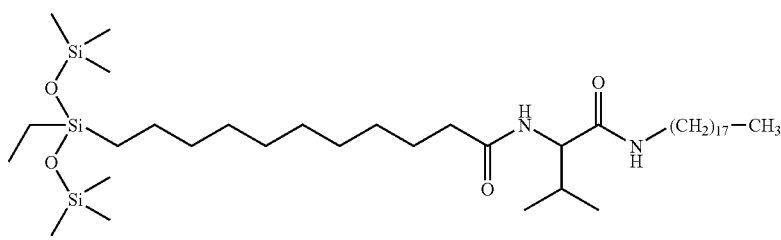
(G40)

These compounds can be prepared according to any one of known synthetic methods.

When mixed with a liquid crystal, the gelling agent characteristically changes thermal properties (for example, sol-gel transition temperature) and refractive index of the liquid crystal composition obtained and the optical properties (for example, Y value when the liquid crystal is planer and Y value when focal conic, etc.) of the liquid crystal display device using the same liquid crystal.

In regard to the gelling agent in the present embodiment, at least two kinds of gelling agents different not only in structure but also in the sol-gel transition temperatures (Tsg (° C.)) of liquid crystal compositions when added to the liquid crystal alone are preferably selected and used. For example, when the sol-gel transition temperature of a liquid crystal composition containing a gelling agent A alone as a gelling agent is designated as Tsg A, and the sol-gel transition temperature of the liquid crystal composition containing a gelling agent B alone as Tsg B (≠Tsg A), it is possible to adjust the Tsg of the liquid crystal composition to a temperature higher than the lower temperature between Tsg A and Tsg B, preferably to a temperature higher than both Tsg A and Tsg B, by adding the gelling agents A and B to the liquid crystal composition. Alternatively, for example, if the sol-gel transition temperature of a liquid crystal composition containing a gelling agent C alone as a gelling agent is designated as Tsg C, it is possible to adjust the Tsg of a liquid crystal composition to a temperature higher than the lowest temperature among Tsg A, Tsg B and Tsg C, preferably to a temperature higher than the highest temperature among them, by adding the gelling agents A to C to the liquid crystal composition.

Tsg of the liquid crystal composition is preferably adjusted to a temperature of 50 to 120° C., particularly 60 to 100° C. In this manner, it is possible to lower the temperature during injection of liquid crystal composition into panel and expand the operating and storage temperatures ranges of the liquid crystal display device. An excessively lower Tsg leads to shrinkage of the operating and storage temperatures ranges of the liquid crystal display device. As a result, the operating and storage temperatures of the liquid crystal display device often become not lower than Tsg, resulting in destruction of the gelling agent network and deterioration in display characteristics that are not recoverable even after cooling. An excessively high Tsg leads to decrease in injection efficiency of the liquid crystal composition into panel. In addition, the Tsg of liquid crystal composition is preferably lower than the liquid crystal/isotropic phase-transition temperature ($T_{LI}$ (° C.)) of the liquid crystal composition, for improvement in contrast of the liquid crystal display device.

The sol-gel transition temperature described in the present specification is a temperature at which a gelling agent melted in a liquid crystal under heat begins to form a network structure by cooling, and thus, the liquid crystal composition may not be necessarily in the gel state at the temperature. Although the liquid crystal composition may not be gelated at room temperature, depending on the amount of the gelling agent added, it is possible to obtain the advantageous effects described in the present specification if the gelling agent forms a network structure in the liquid crystal. The sol-gel transition temperature is determined by using a differential scanning calorimeter (DSC6200; manufactured by Seiko Instruments, Inc); occasionally, there are two or more peaks observed corresponding to the sol-gel transition temperature; and in such a case, the highest temperature is regarded as Tsg.

As for the content of the gelling agent in the present embodiment, the ratio of the gelling agent highest in content is preferably adjusted to 90% by mass or less, in particular 80% by mass or less, with respect to the total amount of the gelling agents during production. A content of the particular gelling agent of more than 90% by mass makes it difficult to improve the whiteness when the liquid crystal is planer and to differentiate the composition in physical properties from liquid crystal compositions containing only one gelling agent.

The total content of at least two kinds of gelling agents is not particularly limited, when the object of the present invention is achieved, but is approximately, for example, 0.5 to 4.0% by mass, in particular 0.5 to 3% by mass, with respect to the total amount of the liquid crystal composition. It is possible to prevent increase of the driving voltage by addition of the gelling agents, if the total content is adjusted in the range above.

Additives such as ultraviolet absorbent may be added additionally to the liquid crystal composition. The ultraviolet absorbent prevents ultraviolet degradation of the liquid crystal composition such as decoloration and change in response with time. For example, materials such as benzophenone compounds, benzotriazole compounds, and salicylate compounds are usable. The addition amount is 5% by mass or less, preferably 3% by mass or less, with respect to the total amount of the liquid crystal composition.

The liquid crystal composition is prepared by mixing respective materials at a specific ratio. The liquid crystal composition may be used for production of devices after purification in contact with an ion-exchange resin, absorbent, or the like and removal of water and impurities as needed.

(Substrate)

The substrates 1 and 2 in FIG. 1 are both transparent, and at least one substrate (at least, incident-light-side substrate 1) of the pair of substrates for use in the liquid crystal display device should be transparent. Examples of the transparent substrates for use include glass plate, and flexible substrates such as of polycarbonate, polyether sulfone, polyarylate, and polyethylene terephthalate. Use of a flexible substrate is preferable, for reduction of the weight of device. Use of a flexible substrate as at least one of the pair of substrates, preferably as both substrates, gives a light and thin device, and is effective in preventing fracture (cracking).

(Electrode)

Examples of the materials for use as electrodes 3 and 4 include transparent conductive films such as ITO (indium tin oxide) and IZO (indium zinc oxide); metal electrodes such as aluminum and silicon; photoconductive films such as amorphous silicon and BSO (bismuth silicon oxide); and the like. In the liquid crystal display device shown in FIG. 1, as described above, plural belt-shaped transparent electrodes 3 and 4 are formed in parallel with each other on the surface of the transparent substrates 1 and 2 with these electrodes 3 and 4 facing each other crosswise. In forming the electrodes in such a manner, for example, an ITO layer is mask-deposited on a substrate by sputtering or the like, or an ITO layer is formed on the entire surface, and then the layer is patterned by photolithography.

(Insulation Thin Film)

Although not needed in principle, an insulation thin film 5 is preferably formed on at least one of the electrodes 3 and 4 for prevention of short circuiting between electrodes and for improvement of the reliability in the gas barrier properties of the liquid crystal display device. Examples of the insulation thin film 5 include inorganic films such as silicon oxide, titanium oxide, zirconium oxide and the alkoxides thereof, and organic films such as polyimide resin, epoxy resin, acrylic resin, and urethane resin. The insulation thin film can be prepared by any one of these materials by a known method such as vapor deposition, spin coating, and roll coating. The insulation thin film may be formed by using the same polymer resin as that for use in preparation of the polymer structure.

(Alignment Film)

The alignment film 7 is not necessarily needed in principle, but is desirably formed for stabilization of the device. When an alignment film is formed, it is formed on an insulation thin film if the insulation thin film is formed on an electrode, and on the electrode if no insulation thin film is formed. Examples of the alignment film 7 include organic films such as polyimide resin, silicone resin, polyamide-imide resin, polyether imide resin, polyvinylbutyral resin, and acrylic resin, and inorganic films such as silicon oxide and aluminum oxide. The alignment film prepared from those materials may be processed, for example, by rubbing. The alignment film may be formed by using the same polymer resin as that for use in preparation of the polymer structure. In the present embodiment, a vertical alignment film is preferably formed on at least one of the pair of substrates for improvement in the whiteness during white display.

(Spacer)

Spacers 13 for maintaining the gap uniformly between the substrates are placed between the pair of substrates. Examples of the spacers include spherical particles of a resin or an inorganic oxide. Typical examples thereof include ball-shaped glasses, ceramic powders, and spherical particles of organic material. Retention spacers having a thermoplastic resin coated on the surface are also used favorably. It is preferable to install both the spacers 13 and the polymer structure 10 for maintaining the gap between substrates more uniformly as shown in FIG. 1, but only one of them may be installed. If the polymer structure is formed, the diameter of the spacer is not larger than, preferably identical with, the height of the polymer structure. When the polymer structure is not formed, the diameter of the spacer corresponds to the cell gap, i.e., the thickness of the liquid crystal layer of the liquid crystal composition.

(Sealing Material)

The sealing material 12 is used for enclosing the liquid crystal composition 11 and thus preventing leakage thereof from between the substrates 1 and 2, and a thermosetting resin such as epoxy or acrylic resin, a photo-curing adhesive, or the like can be used.

(Polymer Structure)

The shape of the polymer structure 10 is not limited and may be cylindrical, cylindroid, square pole-like, or the like, and the configuration thereof may be either random or ordered as in a lattice pattern. Presence of such a polymer structure makes it easier to maintain the gap between substrates to a constant value and to preserve the original shape of liquid crystal display device consistently. In particular, polymer structures in the dot shape are effective in leveling display characteristics, when they are placed at a certain interval. The height of the polymer structure is equivalent to the thickness of cell gap, i.e., the thickness of the liquid crystal layer made of the liquid crystal composition. When a flexible resin substrate is used as substrates holding the liquid crystal layer, it is quite effective to install the polymer structure.

The polymer structure can be formed by the so-called photolithographic method of coating a photocuring resin material such as photoresist material containing an ultraviolet ray-curing monomer on the outmost layer of a substrate (insulation thin film, alignment film) to a desired thickness, performing a pattern exposure by irradiation with ultraviolet light thereon through a mask, and removing the unhardened region.

Alternatively, the polymer structure of a thermoplastic resin may be formed by using a resin material containing a thermoplastic resin dissolved in a suitable solvent. In such a case, the polymer structure may be formed, for example, by a printing method of extruding a thermoplastic resin material onto a substrate with a squeegee through a screen plate, metal mask, or the like, a dispenser or inkjet method of ejecting a resin material through a nozzle onto a substrate, or a transfer method of supplying a resin material onto a flat plate or roller and then transferring it onto a substrate surface.

(Light-scattering Layer)

A light-scattering layer (not shown in the Figure) may be formed on the surface of substrate 1 (top face in the Figure) and/or between the substrate 2 and the visible light-absorbing layer 9. Presence of the light-scattering layer improves the degree of scattering and the whiteness during white display. An example of the material for the light-scattering layer is FT-014 (trade name, manufactured by Polatechno Co., Ltd.).

(Cell Gap)

Increase in the thickness of cell gap, i.e., in the thickness of the liquid crystal layer made of the liquid crystal composition, in the liquid crystal display device is accompanied with increase in the reflectance during white display and also in operational voltage and reflectance during black display. Accordingly in the present invention, the thickness of cell gap may be 2 to 50 μm, but is preferably 3 to 15 μm. It is because it is possible to obtain the advantageous effects of the present invention, high contrast, more effectively even at a relatively lower applied voltage in the preferable range above.

(Production Method)

In the method of producing a liquid crystal display device in a favorable embodiment of the present invention, a liquid crystal composition is injected into a liquid crystal empty cell under vacuum in the heated state, but the liquid crystal display device may be produced by a lamination dropping method.

Injection and enclosure of the liquid crystal composition is performed according to the following method.

A heated liquid crystal composition is injected into an empty cell of a liquid crystal display device under vacuum, and then the injection hole is sealed. The liquid crystal composition is thermally reversible. The empty cell in the liquid crystal display device can be prepared by placing two substrates having the particular components for the liquid crystal display device formed thereon at a position of the component faces facing each other and applying heat or/and pressure thereon. Because the liquid crystal composition become more fluidal by heating, it become easier to inject it between the substrates and form a liquid crystal layer on the substrates in a short period of time.

(Displaying Method)

In the liquid crystal display device in the configuration above, displaying is enabled by applying a pulse voltage to the electrodes 3 and 4 from a drive circuit 20. For example, displaying may be made in the PL-FC driving mode wherein the liquid crystal layer is switched between the planer and focal conic states, or in the PL-Homeo driving mode wherein the liquid crystal layer is switched between the planer and homeotropic states.

For example, in the PL-FC driving mode, the liquid crystal is converted into the planer state when a relatively high-energy pulse voltage is applied, and selectively reflects a light having the wavelength that is determined from the helical pitch and the refractive index of the liquid crystal molecule. On the other hand, the liquid crystal is converted into the transparent state when a relatively low-energy pulse voltage is applied, because the liquid crystal becomes in the focal conic state. There are several driving waveforms proposed, and for example, it is possible to adopt a driving waveform of resetting the liquid crystal into the focal conic state by applying a relatively low voltage for a longer period and then transforming the liquid crystal into the planar state only in a desired region, a driving waveform of resetting the liquid crystal into the planar state by removing the voltage rapidly from a high-voltage and then transforming the liquid crystal into the focal conic state only in a desired region, and a driving waveform consisting of three stage of forming the liquid crystal into the homeotropic state by applying a reset pulse, applying selective pulse having an intensity corresponding to a desired display state and then establishing the finally selected state In these driving modes, displaying can be continued even after removal of an application voltage by using the memorizability of the liquid crystal display device. When a visible light-absorbing layer 9 is formed, the device displays black in color in the focal conic state.

For example, in the PL-Homeo driving mode, it is possible to convert the device into the planar state by removing the voltage rapidly from a high voltage and also to preserve the homeotropic state of the liquid crystal by applying a high voltage continuously. As the transparency in the homeotropic state is higher than that in the focal conic state, it is advantageous to improve contrast (also black in the homeotropic state when a visible light-absorbing layer 9 is formed). It is, however, necessary to apply voltage continuously for preservation of display.

EXAMPLES (Measurement of Sol-Gel Transition Temperature)

The sol-gel transition temperature was determined by using a differential scanning calorimeter (DSC6200, manufactured by Seiko Instruments, Inc). Measurement was performed in the cooling process after a sample is heated to 150° C.

(Measurement of Device Display Characteristics)

Figure 2:
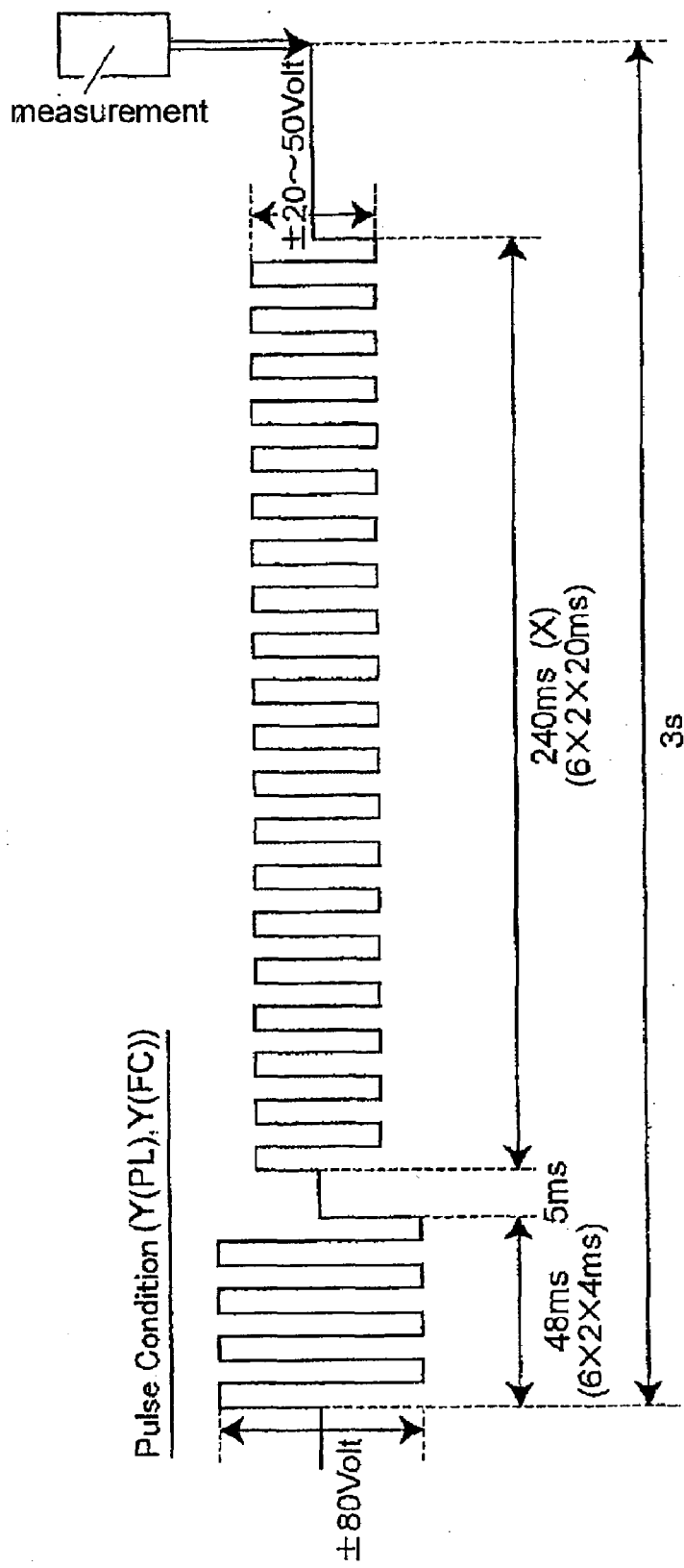
FIG. 2 is a view illustrating the driving waveform used in Examples.
Figure 3:
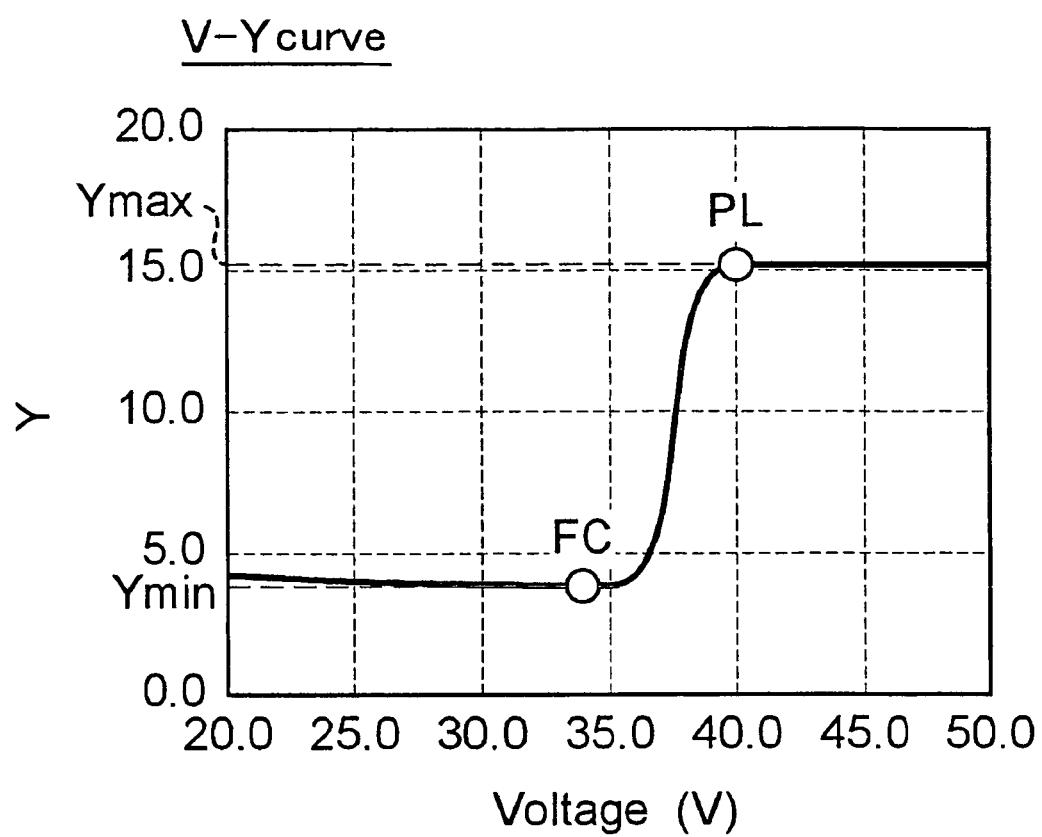
FIG. 3 is a V-Y curve used for setting the planer state and the focal conic state.

The pulses shown in FIG. 2 (in this driving waveform, the liquid crystal is reset once to the planar state by the pulses in early stage) was applied to a display device, and a V-Y curve is obtained. Specifically, the spectral distribution curve (wavelength-reflectance curve) and the Y value (Y) are determined several times repeatedly at measuring points shown in the Figure by using a spectrophotometer (CM3700d; manufactured by Konica Minolta Sensing, Inc.), while changing the voltage (V) in the range (X) of the pulse in FIG. 2 from ±20 to ±50 V, and a V (absolute value of voltage)-Y (Y value) curve is prepared. An example of the V-Y curve is shown in FIG. 3. In the V-Y curve, the state having the maximum Y value (Ymax) is the planer state (PL), while the state having the minimum Y value (Ymin), the focal conic state (FC). The Y values then are designated respectively as Y(PL) and Y(FC). The contrast then can be represented by Y(PL)/Y (FC). The driving voltage was an absolute value of the voltage when the Y value became identical with Ymin+(Ymax−Ymin)/2.

Separately, the spectral distribution curve of the display device when the liquid crystal is in the planer state (during white display) was determined. A chromaticity coordinate (x, y) in the CIE1931 color system was determined from the measured spectral distribution curve, and the whiteness was calculated from the distance (d) thereof from the standard light D65 (x=0.3127, Y=0.3290), according to the following Formula:

$$d=\sqrt{(x-0.3127)^2+(y-0.3290)^2}$$

The distance (d) is a parameter indicating whiteness, and a smaller distance indicates a whiter color.

The following findings on the distance (d) are known.

$d \leq 0.02$: regarded as almost completely white.

$0.02 < d \leq 0.04$: regarded as almost white, but being inferior to the whiteness having $d \leq 0.02$.

$0.04 < d < 0.05$: regarded as not white depending on light source.

$d \geq 0.05$: regarded as yellowish or greenish.

Thus, d is preferably set to a value not larger than 0.02, most preferably $d \leq 0.01$. Each value is determined at 25° C.

Example 1

A nematic liquid crystal (BL006; manufactured by Merck & Co., Inc.)( 84 parts by mass), 15 parts by mass of a chiral material (2:1 mixture of the compound represented by Chemical Formula (C6) and the compound represented by Formula (C2)), 0.5 part by mass of the gelling agent represented by Chemical Formula (G21) and 0.5 part by mass of the gelling agent represented by Chemical Formula (G22) were mixed, stirred under heat to homogeneity, and then, cooled, to give a chiral nematic liquid crystal composition (selective reflection wavelength: 600 nm).

Separately, an empty cell was prepared as follow: A soluble polyimide alignment film AL2022 (manufactured by JSR Corp.) was formed on a glass substrate having a thickness of 0.7 mm carrying an ITO electrode by printing. The above substrates were faced each other; spacers (Micropearl; manufactured by Sekisui Fine Chemical Co., Ltd.) were held between the substrates separated at a distance of 5.5 μm; and the substrates were sealed with a sealing material (Sumilite ERS-2400 (major agent) and ERS-2840 (hardener), manufactured by SUMITOMO BAKELITE Co., Ltd.) except the liquid crystal injection portion and air outlet portion.

Figure 4:
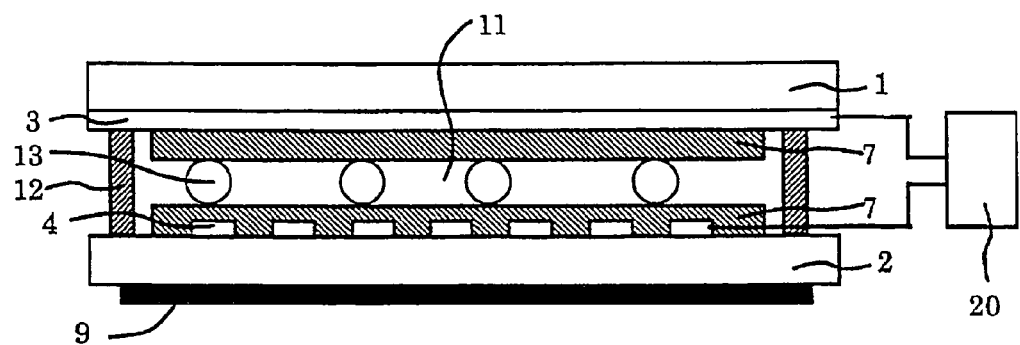
FIG. 4 is a schematic cross-sectional view illustrating the liquid crystal display device prepared in an Example.

A Specific amount of the liquid crystal composition, which was heated into the isotropic phase state, was injected into the empty cell thus prepared and then cooled, and the opening was sealed with Photorec (manufactured by Sekisui Fine Chemical Co., Ltd.). A black light-absorbing layer is formed on the face of the substrate opposite to the incident light-side, to give liquid crystal display device having the structure shown in FIG. 4. The thermal properties of the liquid crystal composition obtained and the display characteristics of the display device were determined as shown below.

Sol-gel transition temperature (Tsg): 76° C.
Y value (PL; during white display): 13.4
Y value (FC; during black display): 4.0
Contrast ratio (CR ratio): 3.4
Distance (d): 0.005

Visual observation of the cell display unit during white display revealed that display was uniform on the entire surface.

Comparative Example 1

A liquid crystal display device was prepared in a manner similar to Example 1, except that a chiral nematic liquid crystal composition (selective reflection wavelength: 600 nm) was prepared by using 84 parts by mass of a nematic liquid crystal (BL006; manufactured by Merck & Co., Inc.), 15 parts by mass of the chiral material (2:1 mixture of the compound represented by Chemical Formula (C6) and the compound represented by Chemical Formula (C2), and 1 part by mass of the gelling agent represented by Chemical Formula (G21).

The thermal properties of the liquid crystal composition obtained and the display characteristics of the display device were determined as shown below.

Sol-gel transition temperature (Tsg): 75° C.
Y value (PL; during white display): 15.8
Y value (FC; during black display): 3.5
Contrast ratio (CR ratio): 4.5
Distance (d): 0.042

Visual observation of the cell display unit during white display revealed that display was uniform on the entire surface.

Comparative Example 2

A liquid crystal display device was prepared in a manner similar to Example 1, except that a chiral nematic liquid crystal composition (selective reflection wavelength: 600 nm) was prepared by using 84 parts by mass of a nematic liquid crystal (BL006; manufactured by Merck & Co., Inc.), 15 parts by mass of a chiral material (2:1 mixture of the compound represented by Chemical Formula (C6) and the compound represented by Chemical Formula (C2)), and 1 part by mass of the gelling agent represented by Chemical Formula (G22).

The thermal properties of the liquid crystal composition obtained and the display characteristics of the display device were determined as shown below.

Sol-gel transition temperature (Tsg): 83° C.
Y value (PL; during white display): 15.3
Y value (FC; during black display): 3.6
Contrast ratio (CR ratio): 4.3
Distance (d): 0.052

Visual observation of the cell display unit during white display revealed that display was uniform on the entire surface.

Example 2

A liquid crystal display device was prepared in a manner similar to Example 1, except that a chiral nematic liquid crystal composition (selective reflection wavelength: 600 nm) was prepared by using 84 parts by mass of a nematic liquid crystal (BL006; manufactured by Merck & Co., Inc.), 15 parts by mass of a chiral material (2:1 mixture of the compound represented by Chemical Formula (C6) and the compound represented by Chemical by Formula (C2)), 0.5 part by mass of the gelling agent represented by Chemical Formula (G10) and 0.5 part by mass of the gelling agent represented by Chemical Formula (G36).

The thermal properties of the liquid crystal composition obtained and the display characteristics of the display device were determined as shown below.

Sol-gel transition temperature (Tsg): 51° C.
Y value (PL; during white display): 10.8
Y value (FC; during black display): 3.6

Contrast ratio (CR ratio): 3.0
Distance (d): 0.004
Visual observation of the cell display unit during white display revealed that display was uniform on the entire surface.

Example 3

A liquid crystal display device was prepared in a manner similar to Example 1, except that a chiral nematic liquid crystal composition (selective reflection wavelength: 600 nm) was prepared by using 84 parts by mass of a nematic liquid crystal (BL006; manufactured by Merck & Co., Inc.), 15 parts by mass of a chiral material (2:1 mixture of the compound represented by Chemical Formula (C6) and the compound represented by Chemical by Formula (C2)), 0.3 part by mass of the gelling agent represented by Chemical Formula (G10), 0.3 part by mass of the gelling agent represented by Chemical Formula (G36) and 0.3 part by mass of the gelling agent represented by Chemical Formula (G35).

The thermal properties of the liquid crystal composition obtained and the display characteristics of the display device were determined as shown below.
Sol-gel transition temperature (Tsg): 56° C.
Y value (PL; display state): 12.6
Y value (FC; during black display): 3.8
Contrast ratio (CR ratio): 3.3
Distance (d): 0.001
Visual observation of the cell display unit during white display revealed that display was uniform on the entire surface.

Example 4

A liquid crystal display device was prepared in a manner similar to Example 1, except that a chiral nematic liquid crystal composition (selective reflection wavelength: 600 nm) was prepared by using 84 parts by mass of a nematic liquid crystal (BL006; manufactured by Merck & Co., Inc.), 15 parts by mass of a chiral material (2:1 mixture of the compound represented by Chemical Formula (C6) and the compound represented by Chemical by Formula (C2)), 0.3 part by mass of the gelling agent represented by Chemical Formula (G2) and 0.7 part by mass of the gelling agent represented by Chemical Formula (G36).

The thermal properties of the liquid crystal composition obtained and the display characteristics of the display device were determined as shown below.
Sol-gel transition temperature (Tsg): 51° C.
Y value (PL; during white display): 12.0
Y value (FC; during black display): 3.4
Contrast ratio (CR ratio): 3.5
Distance (d): 0.005
Visual observation of the cell display unit during white display revealed that display was uniform on the entire surface.

Example 5

A liquid crystal display device was prepared in a manner similar to Example 1, except that a chiral nematic liquid crystal composition (selective reflection wavelength: 600 nm) was prepared by using 84 parts by mass of a nematic liquid crystal (BL006; manufactured by Merck & Co., Inc.), 15 parts by mass of a chiral material (2:1 mixture of the compound represented by Chemical Formula (C6) and the compound represented by Chemical by Formula (C2)), 0.1 part by mass of the gelling agent represented by Chemical Formula (G2) and 0.9 part by mass of the gelling agent represented by Chemical Formula (G36).

The thermal properties of the liquid crystal composition obtained and the display characteristics of the display device were determined as shown below.
Sol-gel transition temperature (Tsg): 50° C.
Y value (PL: during white display): 12.9
Y value (FC; during black display): 3.7
Contrast ratio (CR ratio): 3.5
Distance (d): 0.010
Visual observation of the cell display unit during white display revealed that display was uniform on the entire surface.

Example 6

A liquid crystal display device was prepared in a manner similar to Example 1, except that a chiral nematic liquid crystal composition (selective reflection wavelength: 600 nm) was prepared by using 79 parts by mass of a nematic liquid crystal (BL035; manufactured by Merck & Co., Inc.), 18 parts by mass of the chiral material represented by Chemical Formula (C7), 1.5 parts by mass of the gelling agent represented by Chemical Formula (GIS) and 1.5 parts by mass of the gelling agent represented by Chemical Formula (G37).

The display characteristics of the display device were determined as shown below.
Sol-gel transition temperature (Tsg): 69° C.
Y value (PL; during white display): 11.8
Y value (FC; during black display): 4.5
Contrast ratio (CR ratio): 2.6
Distance (d): 0.015
In addition, visual observation of the cell display unit during white or black display revealed that the entire surface was displayed uniformly.

Comparative Example 3

A liquid crystal display device was prepared in a manner similar to Example 1, except that a chiral nematic liquid crystal composition (selective reflection wavelength: 600 nm) was prepared by using 79 parts by mass of a nematic liquid crystal (BL035; manufactured by Merck & Co., Inc.), 18 parts by mass of the chiral material represented by Chemical Formula (C7), and 3 parts by mass of the gelling agent represented by Chemical Formula (G37).

The display characteristics of the display device were determined as shown below.
Sol-gel transition temperature (Tsg): 46° C.
Y value (PL; during white display): 14.9
Y value (FC: during black display): 3.2
Contrast ratio (CR ratio): 4.7
Distance (d): 0.027
Visual observation of the cell display unit during white display revealed that display was uniform on the entire surface.

Comparative Example 4

A liquid crystal display device was prepared in a manner similar to Example 1, except that a chiral nematic liquid crystal composition (selective reflection wavelength: 600 nm) was prepared by using 79 parts by mass of a nematic liquid crystal (BL035; manufactured by Merck & Co., Inc.), 18 parts by mass of the chiral material represented by Chemical Formula (C7), and 3 parts by mass of the gelling agent represented by Chemical Formula (G15).

The display characteristics of the display device were determined as shown below.

Sol-gel transition temperature (Tsg): 75° C.
Y value (PL; during white display): 10.7
Y value (FC: during black display): 4.2
Contrast ratio (CR ratio): 2.5
Distance (d): 0.026

Visual observation of the cell display unit during white display revealed that display was uniform on the entire surface.

Example 7

A liquid crystal display device was prepared in a manner similar to Example 1, except that a chiral nematic liquid crystal composition (selective reflection wavelength: 600 nm) was prepared by using 84 parts by mass of a nematic liquid crystal (BL006; manufactured by Merck & Co., Inc.), 15 parts by mass of a chiral material (2:1 mixture of the compound represented by Chemical Formula (C6) and the compound represented by Chemical by Formula (C2)), 0.5 part by mass of the gelling agent represented by Chemical Formula (G17) and 0.5 part by mass of the gelling agent represented by Chemical Formula (G39).

The thermal properties of the liquid crystal composition obtained and the display characteristics of the display device were determined as shown below.

Sol-gel transition temperature (Tsg): 72° C.
Y value (PL: during white display): 12.2
Y value (FC; during black display): 3.4
Contrast ratio (CR ratio): 3.6
Distance (d): 0.012

Visual observation of the cell display unit during white display revealed that display was uniform on the entire surface.

The results in Examples 1 to 7 and Comparative Examples 1 to 4 are summarized in Table 1.

TABLE 1

|  | Tsg/° C. | Y(PL) | Y(FC) | CR ratio | d |
|---|---|---|---|---|---|
| Example 1 | 76 | 13.4 | 4.0 | 3.4 | 0.005 |
| Comparative Example 1 | 75 | 15.8 | 3.5 | 4.5 | 0.042 |
| Comparative Example 2 | 83 | 15.3 | 3.6 | 4.3 | 0.052 |
| Example 2 | 51 | 10.8 | 3.6 | 3.0 | 0.004 |
| Example 3 | 56 | 12.6 | 3.8 | 3.3 | 0.001 |
| Example 4 | 51 | 12.0 | 3.4 | 3.5 | 0.005 |
| Example 5 | 50 | 12.9 | 3.7 | 3.5 | 0.010 |
| Example 6 | 69 | 11.8 | 4.5 | 2.6 | 0.015 |
| Comparative Example 3 | 46 | 14.9 | 3.2 | 4.7 | 0.027 |
| Comparative Example 4 | 75 | 10.7 | 4.2 | 2.5 | 0.026 |
| Example 7 | 72 | 12.2 | 3.4 | 3.6 | 0.012 |

Example 8

A nematic liquid crystal (E44; manufactured by Merck & Co., Inc.)( 99 parts by mass), 0.5 part by mass of the gelling agent represented by Chemical Formula (G2) and 0.5 part by mass of the gelling agent represented by Chemical Formula (G37) were mixed and stirred under heat, until the mixture became homogeneous, and then cooled, to give a nematic liquid crystal composition X. The thermal properties of the liquid crystal composition X thus obtained were determined as shown below.

Sol-gel transition temperature (Tsg): 55° C.

Comparative Example 5

A nematic liquid crystal (E44; manufactured by Merck & Co., Inc.)( 99 parts by mass), and 1 part by mass of the gelling agent represented by Chemical Formula (G2) were mixed and stirred under heat, until the mixture became homogeneous, and then cooled, to give a nematic liquid crystal composition Y. The thermal properties of the liquid crystal composition Y thus obtained were determined as shown below.

Sol-gel transition temperature (Tsg): 47° C.

Comparative Example 6

A nematic liquid crystal (E44; manufactured by Merck & Co., Inc.) (99 parts by mass) and 1 part by mass of the gelling agent represented by Chemical Formula (G37) were mixed and stirred under heat, until the mixture became homogeneous, and then cooled, to give a nematic liquid crystal composition Z. The thermal properties of the liquid crystal composition Z thus obtained were determined as shown below.

Sol-gel transition temperature (Tsg): 46° C.

As apparent, the sol-gel transition temperature of the sample obtained in Example 7, wherein two kinds of gelling agent were used in combination, was higher than that of the samples in Comparative Example 5 or 6, wherein only one gelling agent was used. Thus, the advantage of using gelling agents in combination was shown not only for chiral nematic liquid crystal compositions, but also for nematic liquid crystal compositions.

Reference Example 1

Toluene(75 parts by mass), 13 parts by mass of the gelling agent represented by Chemical Formula (G2) and 13 parts by mass of the gelling agent represented by Chemical Formula (G36) were mixed and stirred under heat until the mixture became homogeneous, and then cooled, to give a toluene gel. The refractive index of the toluene gel was determined to be 1.50. The refractive index of the gelling agent calculated by extrapolation was 1.51.

The refractive index was determined by using No. 1 Abbe refractometer (manufactured by ATAGO Co., Ltd.). The refractive index of the gelling agent was calculated by extrapolation by using the refractive index of toluene at 1.49. The same applied hereinafter in the following Examples.

Reference Example 2

Toluene(75 parts by mass) and 25 parts by mass of the gelling agent represented by Chemical Formula (G2) were mixed and stirred under heat until the mixture became homogeneous, and then cooled, to give a toluene gel. The refractive index of the toluene gel determined to be 1.51. The refractive index of the gelling agent calculated by extrapolation was 1.55.

Reference Example 3

Toluene(75 parts by mass) and 25 parts by mass of the gelling agent represented by Chemical Formula (G36) were mixed and stirred under heat until the mixture became homogeneous, and then cooled, to give a toluene gel. The refractive index of the toluene gel determined to be 1.49. The refractive index of the gelling agent calculated by extrapolation was 1.48.

As described above, the refractive index of the sample obtained in Reference Example 1, wherein two kinds of gelling agent was used in combination, was an intermediate value between those of the samples in Reference Examples 2 and 3 wherein only one gelling agent was used. Thus, it was also possible to adjust the refractive index by mixing gelling agents.

What is claimed is:

1. A liquid crystal composition, comprising:
   at least two gelling agents; and
   a liquid crystal showing a liquid crystal phase at room temperature.

2. The liquid crystal composition of claim 1, wherein the at least two gelling agents comprise at least one gelling agent containing a siloxane skeleton in the molecule and at least one gelling agent not containing a siloxane skeleton in the molecule.

3. The liquid crystal composition of claim 1, wherein at least one of the gelling agents of the at least two gelling agents is a self-organizing gelling agent having a molecular structure consisting of an intermolecular binding group-containing unit and a remainder unit, the remainder unit containing a saturated aliphatic hydrocarbon group having 4 or more carbon atoms.

4. The liquid crystal composition of claim 3, wherein the at least two gelling agents are self-organizing gelling agents having a molecular structure consisting of an intermolecular binding group-containing unit and a remainder unit, the remainder unit containing a saturated aliphatic hydrocarbon group having 4 or more carbon atoms.

5. The liquid crystal composition of claim 4, wherein the number of carbon atoms of the saturated aliphatic hydrocarbon group in the remainder unit contained in the at least two self-organizing gelling agents is different by 4 or more.

6. The liquid crystal composition of claim 4, wherein the at least two self-organizing gelling agents comprises at least one gelling agent containing a siloxane skeleton in the molecule and at least one gelling agent not containing a siloxane skeleton in the molecule.

7. The liquid crystal composition of claim 4, wherein the at least two self-organizing gelling agents have siloxane skeletons in the molecules, and the number of carbon atoms of the saturated aliphatic hydrocarbon group in the remainder unit contained in the at least two self-organizing gelling agents is different by 4 or more.

8. The liquid crystal composition of claim 3, wherein the intermolecular binding group-containing unit in the self-organizing gelling agent is represented by General Formula (1):

(1)

in which $B_1$ and $B_2$ each independently represent an intermolecular hydrogen-bonding group; b represents the carbon number of the carbon chain connecting between $B_1$ and $B_2$ and is a natural number of 5 or less.

9. The liquid crystal composition of claim 8, wherein $B_1$ and $B_2$ each independently represent —CONH—, —NHCO—, —COO— or —OCO—, provided that at least one of $B_1$ and $B_2$ is —CONH— or —NHCO—.

10. The liquid crystal composition of claim 3, wherein the intermolecular binding group-containing unit in the self-organizing gelling agent is represented by General Formula (2), General Formula (3) or General Formula (4):

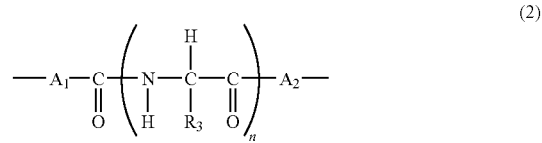

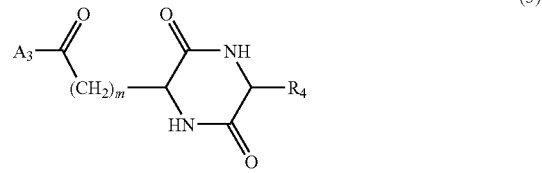

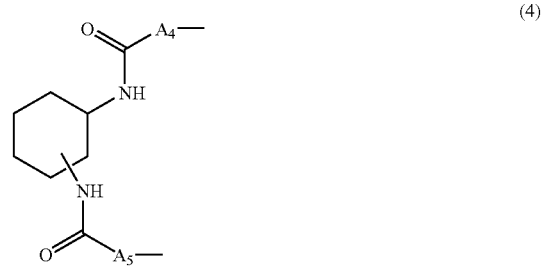

in which $A_1$ to $A_5$ each independently represent —O—, —NH— or a single bond (—);

$R_3$ and $R_4$ each independently represent an alkyl group having 1 to 20 carbon atoms, a benzyl group, —(CH$_2$)$_a$—COO—Re$_8$, —(CH$_2$)$_a$—OCO—Re$_8$, —(CH$_2$)$_a$—CONH—Re$_8$, —(CH$_2$)$_a$—NHCO—Re$_8$, —(CH$_2$)$_a$—NHCONH—Re$_8$, —(CH$_2$)$_a$—NHCOO—Re$_8$, —(CH$_2$)$_a$—OCONH—Re$_8$, or —(CH$_2$)$_a$—S—Re$_8$, provided that a is a natural number of 5 or less and that Re$_8$ represents an alkyl group having 1 to 20 carbon atoms; and n is a natural number of 5 or less.

11. The liquid crystal composition of claim 4, wherein the intermolecular binding group-containing unit in each of the at least two self-organizing gelling agents is represented by General Formula (1):

(1)

in which $B_1$ and $B_2$ each independently represent an intermolecular hydrogen-bonding group; b represents the carbon number of the carbon chain connecting between $B_1$ and $B_2$ and is a natural number of 5 or less.

12. The liquid crystal composition of claim 11, wherein the at least two self-organizing gelling agents have a molecular structure consisting of an intermolecular binding group-containing unit represented by General Formula (1);

wherein the value of $B_1$ is the same for the at least two self-organizing gelling agents; and wherein the value of $B_2$ is the same for the at least two self-organizing gelling agents.

13. The liquid crystal composition of claim 4, wherein the intermolecular binding group-containing units of the at least two self-organizing gelling agents are represented by General Formula (2):

(2)

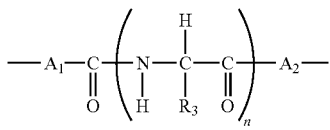

in which $A_1$ and $A_2$ each independently represent —O—, —NH— or a single bond (—);

$R_3$ represents an alkyl group having 1 to 20 carbon atoms, a benzyl group, —$(CH_2)_a$—COO—$Re_8$, —$(CH_2)_a$—OCO—$Re_8$, —$(CH_2)_a$—CONH—$Re_8$, —$(CH_2)_a$NHCO—$Re_8$, —$(CH_2)_a$NHCONH—$Re_8$, —$(CH_2)_a$—NHCOO—$Re_8$, —$(CH_2)_a$—OCONH—$Re_8$, or —$(CH_2)_a$—S—$Re_8$, provided that a is a natural number of 5 or less and that $Re_8$ represents an alkyl group having 1 to 20 carbon atoms; and n is a natural number of 5 or less.

14. The liquid crystal composition of claim 4, wherein the at least two the self-organizing gelling agents are represented by General Formula (2a):

(2a)

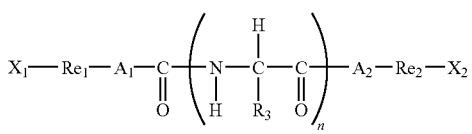

in which $A_1$ and $A_2$ each independently represent —O—, —NH— or a single bond (—);

$R_3$ represents an alkyl group having 1 to 20 carbon atoms, a benzyl group, —$(CH_2)_a$—COO—$Re_8$, —$(CH_2)_a$—OCO—$Re_8$, —$(CH_2)_a$—CONH—$Re_8$, —$(CH_2)_a$—NHCO—$Re_8$, —$(CH_2)_a$—NHCONH—$Re_8$, —$(CH_2)_a$—NHCOO—$Re_8$, —$(CH_2)_a$—OCONH—$Re_8$, or —$(CH_2)_a$—S—$Re_8$, provided that a is a natural number of 5 or less and that $Re_8$ represents an alkyl group having 1 to 20 carbon atoms;

n is a natural number of 5 or less;

$X_1$ and $X_2$ each independently represent a hydrogen atom, a vinyl group, a phenyl group, a biphenyl group, a phenyloxy group, a biphenyloxy group, or a monovalent group having a siloxane skeleton; and the phenyl group, the biphenyl group, the phenyloxy group, the biphenyloxy group, and the monovalent group having a siloxane skeleton may have a substituent; and $Re_1$ and $Re_2$ each independently represent an alkylene group having 1 to 20 carbon atoms, provided that at least one of $Re_1$ and $Re_2$ is an alkylene group having 4 or more carbon atoms.

15. The liquid crystal composition of claim 4, wherein the intermolecular binding group-containing units of the at least two self-organizing gelling agents are represented by General Formula (3):

(3)

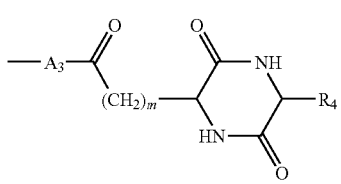

in which $A_3$ represents —O—, —NH— or a single bond (—);

$R_4$ represents an alkyl group having 1 to 20 carbon atoms, a benzyl group, —$(CH_2)_a$—COO—$Re_8$, —$(CH_2)_a$—OCO—$Re_8$, —$(CH_2)_a$—CONH—$Re_8$, —$(CH_2)_a$—NHCO—$Re_8$, —$(CH_2)_a$—NHCONH—$Re_8$, —$(CH_2)_a$—NHCOO—$Re_8$, —$(CH_2)_a$—OCONH—$Re_8$, or —$(CH_2)_a$—S—$Re_8$, provided that a is a natural number of 5 or less and that $Re_8$ represents an alkyl group having 1 to 20 carbon atoms;

m is a natural number of 5 or less.

16. The liquid crystal composition of claim 4, wherein the at least two self-organizing gelling agents are represented by General Formula (3a):

(3a)

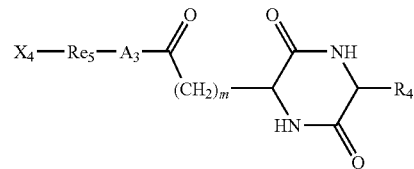

in which $A_3$ represents —O—, —NH— or a single bond (—);

$R_4$ represents an alkyl group having 1 to 20 carbon atoms, a benzyl group, —$(CH_2)_a$COO—$Re_8$, —$(CH_2)_a$—OCO—$Re_8$, —$(CH_2)_a$—CONH—$Re_8$, —$(CH_2)_a$—NHCO—$Re_8$, —$(CH_2)_a$—NHCONH—$Re_8$, —$(CH_2)_a$—NHCOO—$Re_8$, —$(CH_2)_a$—OCONH—$Re_8$, or —$(CH_2)_a$—S—$Re_8$, provided that a is a natural number of 5 or less and that $Re_8$ represents an alkyl group having 1 to 20 carbon atoms;

m is a natural number of 5 or less;

$X_4$ represents a hydrogen atom, a vinyl group, a phenyl group, a biphenyl group, a phenyloxy group, a biphenyloxy group, or a monovalent group having a siloxane skeleton; and the phenyl group, the biphenyl group, the phenyloxy group, the biphenyloxy group, and the monovalent group having a siloxane skeleton may have a substituent;

$Re_5$ represents an alkylene group having 4 to 20 carbon atoms.

17. The liquid crystal composition of claim 4, wherein the intermolecular binding group-containing units of the at least two self-organizing gelling agents are represented by General Formula (4):

(4)

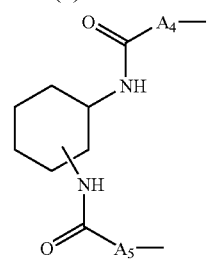

in which $A_4$ and $A_5$ each independently represent —O—, —NH— or a single bond (—).

18. The liquid crystal composition of claim 4, wherein the at least two self-organizing gelling agents are represented by General Formula (4a):

(4a)

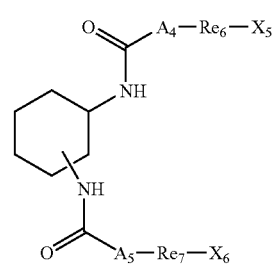

in which $A_4$ and $A_5$ each independently represent —O—, —NH— or a single bond (—);

$X_5$ and $X_6$ each independently represent a hydrogen atom, a vinyl group, a phenyl group, a biphenyl group, a phenyloxy group, a biphenyloxy group, or a monovalent group having a siloxane skeleton; and the phenyl group, the biphenyl group, the phenyloxy group, the biphenyloxy group, and the monovalent group having a siloxane skeleton may have a substituent;

$Re_6$ and $Re_7$ each independently represent an alkylene group having 1 to 20 carbon atoms, provided that at least one of $Re_6$ and $Re_7$ is an alkylene group having 4 or more carbon atoms.

19. The liquid crystal composition of claim 1, wherein the ratio of the gelling agent highest in content is 90% by mass or less with respect to the total amount of the gelling agents contained in liquid crystal composition.

20. The liquid crystal composition of claim 1, wherein the total content of the gelling agents is 0.5 to 4.0% by mass with respect to the total amount of the liquid crystal composition.

21. The liquid crystal composition of claim 1, wherein the liquid crystal is a liquid crystal that forms a cholesteric phase at room temperature.

22. The liquid crystal composition of claim 1, wherein the liquid crystal that forms a cholesteric phase at room temperature comprises a nematic liquid crystal and a chiral material.

23. The liquid crystal composition of claim 1, wherein a sol-gel transition temperature is lower than the liquid crystal/isotropic phase-transition temperature.

24. A liquid crystal display device comprising the liquid crystal composition of claim 1, and wherein the liquid crystal display device has a selective-reflection peak wavelength between 500 and 700 nm.

25. The liquid crystal display device of claim 24, wherein a liquid crystal composition is put and held between a pair of substrates and at least one of the substrates has an electrode.

26. The liquid crystal display device of claim 24, wherein a vertical alignment film is formed on at least one of a pair of substrates.

27. A liquid crystal composition, comprising:

at least two self-organizing gelling agents;

a nematic liquid crystal showing a cholesteric phase at room temperature, and a chiral material;

a ratio of the gelling agent highest in content being 90% by mass or less with respect to the total amount of the gelling agents contained, and a sol-gel transition temperature being lower than liquid crystal/isotropic phase-transition temperature.

28. The liquid crystal composition of claim 11, wherein the at least two self organizing gelling agents have a molecular structure consisting of an intermolecular binding group-containing unit represented by General Formula (1); and wherein the value of b is the same for the at least two self-organizing gelling agents.

* * * * *

UNITED STATES PATENT AND TRADEMARK OFFICE
CERTIFICATE OF CORRECTION

PATENT NO.         : 7,517,566 B2
APPLICATION NO. : 11/444903
DATED              : April 14, 2009
INVENTOR(S)        : Akihito Hisamitsu et al.

It is certified that error appears in the above-identified patent and that said Letters Patent is hereby corrected as shown below:

In column 37, claim 14, line 21, before "self-organizing gelling agents" delete "the".

Signed and Sealed this

Fifteenth Day of September, 2009

David J. Kappos
*Director of the United States Patent and Trademark Office*